United States Patent
Azami et al.

(10) Patent No.: US 6,434,225 B1
(45) Date of Patent: Aug. 13, 2002

(54) COMMUNICATION SUPPORT SYSTEM IN WHICH A RINGING SOUND CONTROL PROCESSING IS PERFORMED IN RESPONSE TO A CALL FROM A TELEPHONE NETWORK

(75) Inventors: Toshihiro Azami; Katsutoshi Yano; Jun Kakuta; Tomoyoshi Takebayashi; Kimikazu Furukawa; Yasuo Satoh, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/150,233

(22) Filed: Sep. 10, 1998

(30) Foreign Application Priority Data

Nov. 20, 1997 (JP) ............................................. 9-319652

(51) Int. Cl.[7] ...................... H04M 15/06; H04M 11/00
(52) U.S. Cl. ............................ 379/142.01; 379/142.04; 379/142.07; 379/88.13; 379/93.14; 379/93.09; 379/100.15
(58) Field of Search .................................. 379/142, 199, 379/100.16, 88.11, 88.13, 88.19, 90.01, 93.01, 93.14, 93.27, 100.15, 93.09, 142.01, 142.04, 142.07, 171, 350, 372

(56) References Cited

U.S. PATENT DOCUMENTS

| | | | | |
|---|---|---|---|---|
| 4,340,776 A | * | 7/1982 | Ganz et al. .................. 178/3 |
| 5,351,289 A | * | 9/1994 | Logsdon et al. ............. 379/142 |
| 5,377,260 A | * | 12/1994 | Long ............................. 379/95 |
| 5,383,191 A | * | 1/1995 | Hobgood et al. ........... 371/11.2 |
| 5,388,150 A | * | 2/1995 | Schneyer et al. ............. 379/67 |
| 5,444,771 A | * | 8/1995 | Ohnishi .................. 379/100.16 |
| 5,517,557 A | * | 5/1996 | Tanaka ......................... 379/67 |
| 5,737,400 A | * | 4/1998 | Bagchi ....................... 379/142 |
| 5,781,621 A | * | 7/1998 | Lim et al. ................... 379/142 |
| 5,812,648 A | * | 9/1998 | Wanner ...................... 379/142 |
| 5,892,815 A | * | 4/1999 | Yoshida et al. ........ 379/100.16 |
| 5,960,068 A | * | 9/1999 | Yoshida et al. ........ 379/100.15 |
| 5,995,603 A | * | 11/1999 | Anderson ................... 379/142 |

* cited by examiner

Primary Examiner—Curtis Kuntz
Assistant Examiner—Quoc Tran
(74) Attorney, Agent, or Firm—Staas & Halsey LLP

(57) ABSTRACT

A communication support system includes a switching unit which connects a telephone unit through a transmission path to a telephone network when the switching unit is set in a first state, and disconnects the telephone unit from the telephone network by cutting off the transmission path when the switching unit is set in a second state. A ringer detection unit detects a ringer signal from the telephone network. A determination unit determines, in response to the detection of the ringer signal, whether the switching unit is to be set in one of the first state and the second state in accordance with first switching control data. A switching control unit controls setting of the switching unit in one of the first state and the second state in response to a control signal, indicative of the determination, sent by the determination unit.

33 Claims, 24 Drawing Sheets

| READOUT OF TIMER | DETERMINATION |
|---|---|
| 0:00~6:00 | RELAY 114→OFF |
| 6:00~24:00 | RELAY 114→ON |

F I G. 8
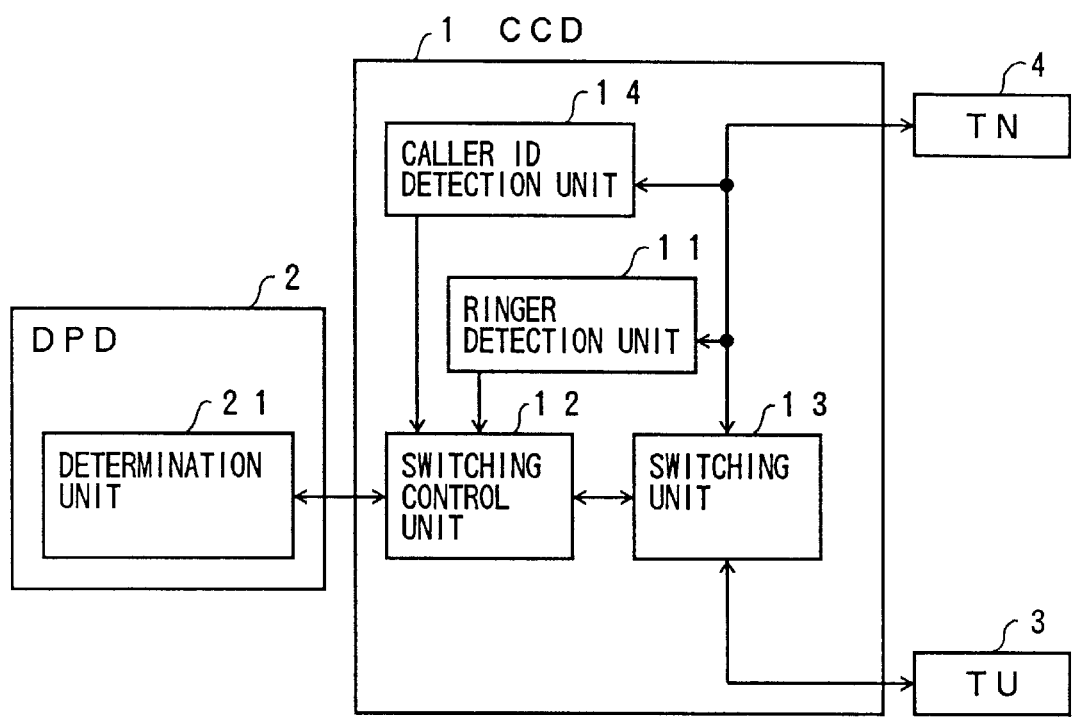

| PHONE NUMBER | NAME | DETERMINATION |
|---|---|---|
| 044-AAA-BBBB | X | RELAY 114→ON |
| 078-CCC-DDDD | Y | RELAY 114→OFF |
| ....... | | |
| NOT DEFINED | | RELAY 114→OFF |

F I G. 17
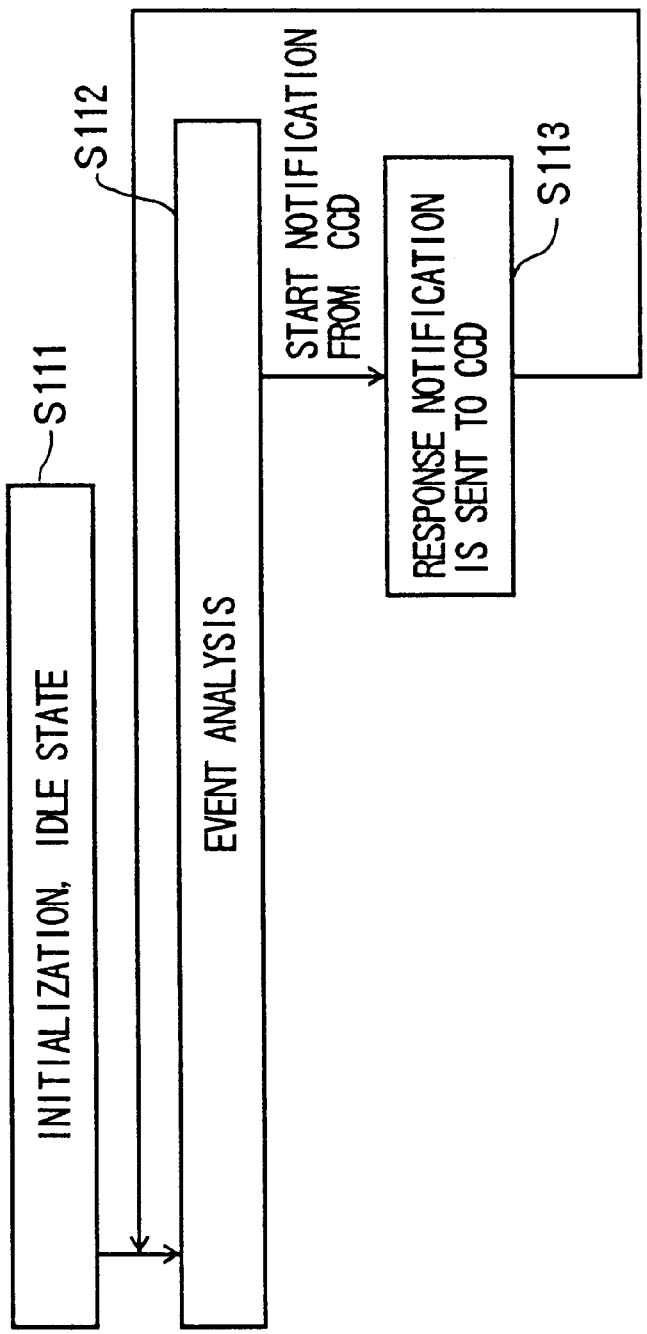

FIG. 24

| RINGER PATTERN NUMBER [N] | RINGER ON TIME [TH1] (SECONDS) | RINGER OFF TIME [TH2] (SECONDS) |
|---|---|---|
| 1 | 1 | 2 |
| 2 | 1 | 1 |
| 3 | 2 | 2 |
| 4 | 0.5 | 1.5 |
| 5 | 2 | 1 |

FIG. 26

| PHONE NUMBER | NAME | DETERMINATION |
|---|---|---|
| 044-AAA-BBBB | X | RELAY 114→ON |
| 078-CCC-DDDD | Y | RELAY 114→OFF |
| 0423-EE-FFFF | Z | SPECIAL RINGER PATTERN #2 |
| 03-GGGG-HHHH | W | SPECIAL RINGER PATTERN #3 |
| ...... | ... | ....... |
| NOT DEFINED | | RELAY 114→OFF |

COMMUNICATION SUPPORT SYSTEM IN WHICH A RINGING SOUND CONTROL PROCESSING IS PERFORMED IN RESPONSE TO A CALL FROM A TELEPHONE NETWORK

BACKGROUND OF THE INVENTION (1) Field of the Invention

The present invention relates to a communication support system adapted to connect a telephone unit and a data processing device through a communication control device to a telephone network, wherein a ringing sound control processing is performed in response to a call from the telephone network to the telephone unit by using the communication control device and the data processing device. Further, the present invention relates to a computer readable medium which stores program code instructions for causing a processor to execute a ringing sound control processing in response to a call from a telephone network to a telephone unit in a communication support system.

In recent years, personal computers for home use are becoming widespread and modems are enhancing the popularity in personal computers. The increasing prevalence of the personal computers having a built-in modem makes it easier to access the Internet or other communication links through telephone lines. The telephone lines have been shared by the computers and the telephones.

In recent developments, there is a demand for a useful, advanced communication support system in which a ringer signal processing is performed upon incoming of a call from a telephone network by using the personal computer having a built-in modem, in order to provide computer-assisted telephone services for the telephone user. However, in existing communication support systems, the computer-assisted telephone services are provided only by locally operating the data processing device, and the telephones and the computers are separately used. It is desired to provide a communication support system which allows the telephone user to easily obtain such computer-assisted telephone services.

(2) Description of the Related Art

A conventional communication support system which provides existing telephone services by executing an application program installed in the system is known. Such a communication support system is adapted to connect a telephone unit and a data processing device through a communication control device to a telephone network. The telephone unit is, for example, a telephone set. The telephone network is, for example, a public switched telephone network (PSTN) or an integrated services digital network (ISDN). The application program is installed in the data processing device to provide the telephone services, and the application program is executed while the data processing device is connected through the communication control device to the telephone unit. The data processing device is, for example, a personal computer. The communication control device is, for example, a modem or a terminal adapter.

In the above-mentioned conventional system, the telephone unit is always connected through the communication control device to the telephone network regardless of whether a call from the telephone network arrives at the telephone unit. The telephone unit directly receives a ringer signal upon incoming of a call from the telephone network, and outputs a ringing sound in accordance with the ringer signal.

In the above-mentioned conventional system, the telephone unit outputs a ringing sound upon incoming of a call from the telephone network. It is impossible for the conventional communication support system to control a ringing sound on/off in response to the incoming call. In addition, it is impossible for the conventional communication support system to carry out a ringing sound control processing in which the telephone unit rings out by one of a plurality of special ringer patterns in response to the incoming call.

SUMMARY OF THE INVENTION

An object of the present invention is to provide an improved communication support system in which the above-mentioned problems are eliminated.

Another object of the present invention is to provide a communication support system which carries out a ringing sound control processing and a determination processing in parallel wherein the ringing sound on/off of the telephone unit is controlled in response to the call from the telephone network, or the telephone unit is controlled to ring out by a specified one of a plurality of special ringer patterns.

Still another object of the present invention is to provide a communication control device in the communication support system in which the ringing sound on/off of the telephone unit is controlled in response to the call from the telephone network, or the telephone unit is controlled to ring out by a specified one of a plurality of special ringer patterns.

A further object of the present invention is to provide a computer readable medium in which the ringing sound on/off of the telephone unit is controlled in response to the call from the telephone network, or the telephone unit is controlled to ring out by a specified one of a plurality of special ringer patterns.

The above-mentioned objects of the present invention are achieved by a communication support system adapted to connect a telephone unit through a transmission path of a communication control device to a telephone network and adapted to connect a data processing device through the communication control device to the telephone network, the communication support system comprising: a switching unit which connects the telephone unit through the transmission path to the telephone network when the switching unit is set in a first state, and disconnects the telephone unit from the telephone network by cutting off the transmission path when the switching unit is set in a second state; a ringer detection unit which detects a ringer signal from the telephone network; a determination unit which determines, in response to the detection of the ringer signal by the ringer detection unit, whether the switching unit is to be set in one of the first state and the second state in accordance with first switching control data stored in the data processing device; and a switching control unit which controls setting of the switching unit in one of the first state and the second state in response to a control signal, indicative of the determination, sent by the determination unit.

The above-mentioned objects of the present invention are achieved by a communication control device adapted to connect a telephone unit through a transmission path to a telephone network and adapted to connect a data processing device through the communication control device to the telephone network, the communication control device comprising: a switching unit which connects the telephone unit through the transmission path to the telephone network when the switching unit is set in a first state, and disconnects the telephone unit from the telephone network by cutting off the transmission path when the switching unit is set in a second state; a ringer detection unit which detects a ringer signal from the telephone network; and a switching control unit which controls setting of the switching unit in one of the first state and the second state in response to a control signal sent by the data processing device when the ringer signal is detected.

The above-mentioned objects of the present invention are achieved by a computer readable medium storing program code for causing a processor to execute a ringing sound control processing on a communication control device in a communication support system which is adapted to connect a telephone unit through a transmission path of the communication control device to a telephone network and adapted to connect a data processing device through the communication control device to the telephone network, the computer readable medium comprising: first program code instructions which cause the processor to detect a ringer signal from the telephone network by using a ringer detection unit; and second program code instructions which cause the processor to control setting of a switching unit in one of a first state and a second state by using a switching control unit in response to a control signal sent by the data processing device when the ringer signal is detected.

The above-mentioned objects of the present invention are achieved by a computer readable medium storing program code for causing a first processor to execute a determination processing on the data processing device in the communication support system in parallel with the ringing sound control processing, the computer readable medium comprising program code instructions which cause the first processor to determine, in response to the detection of the ringer signal by the ringer detection unit, whether the switching unit is to be set in one of the first state and the second state in accordance with first switching control data stored in the data processing device.

In the communication support system of the present invention, a ringing sound control processing routine and a determination processing routine are carried out in parallel. It is possible for the communication support system of the present invention to effectively control the ringing sound on/off of the telephone unit in response to the call from the telephone network. In one embodiment of the communication support system of the present invention, it is possible to set the ringing sound output of the telephone unit in an OFF state and perform an answering machine function when the ringer signal is sent from the telephone network to the telephone unit at midnight.

In the communication support system of the present invention, one of various ringing sound control processing routines and one of various determination processing routines are carried out by the communication control device and the data processing device in parallel. It is possible for the communication support system of the present invention to effectively control the telephone unit so as to ring out by a specified one of a plurality of special ringer patterns in response to the call from the telephone network.

BRIEF DESCRIPTION OF THE DRAWINGS

The above and other objects, features and advantages of the present invention will be more apparent from the following detailed description when read in conjunction with the accompanying drawings in which:

FIG. 8 is a block diagram of another embodiment incorporating the principles of the present invention;

FIG. 17 is a flowchart for explaining a determination processing routine executed by the data processing device of FIG. 9;

FIG. 24 is a diagram for explaining an example of a plurality of special ringer patterns used to generate a ringer signal;

FIG. 26 is a diagram for explaining an example of a third switching control data table stored in the communication support system of FIG. 22.

DETAILED DESCRIPTION OF THE PREFERRED EMBODIMENTS

A description will now be given of the preferred embodiments of the communication support system of the present invention with reference to the accompanying drawings.

Figure 1:
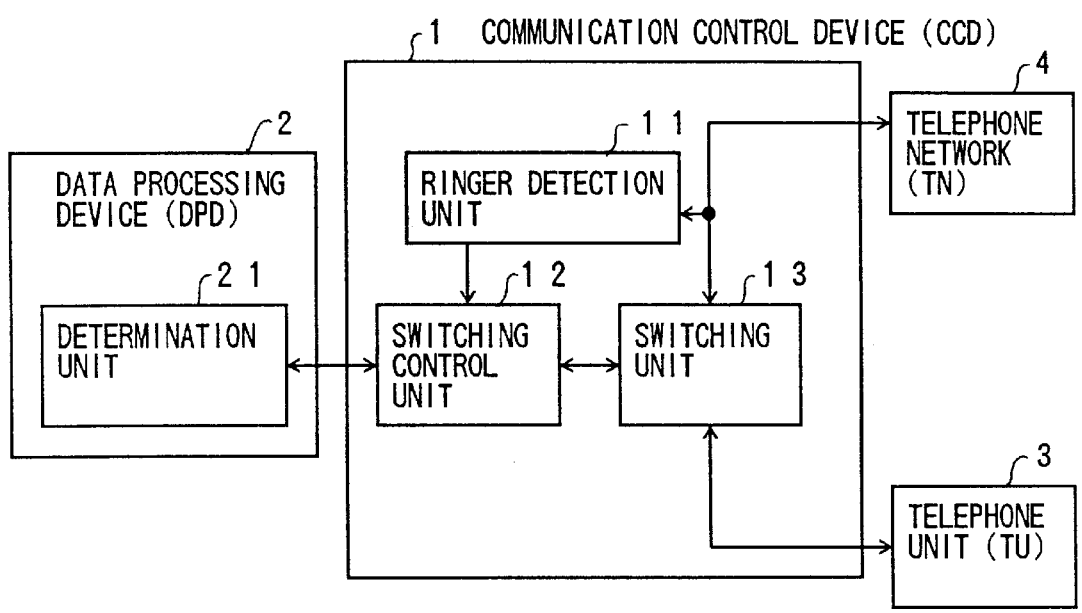
FIG. 1 is a block diagram of an embodiment incorporating the principles of the present invention.

FIG. 1 shows an embodiment of a communication support system which incorporates the principles of the present invention.

As shown in FIG. 1, the communication support system generally has a communication control device (hereinafter called CCD) 1, a data processing device (hereinafter called DPD) 2, a telephone unit (hereinafter called TU) 3, and a telephone network (hereinafter called TN) 4. The communication support system is adapted to connect the TU 3 through a transmission path of the CCD 1 to the TN 4 and adapted to connect the DPD 2 through the CCD 1 to the TN 4.

The telephone unit (TU) 3 provides existing voice transmission and reception functions and an existing dialing function. The TU 3 may include a radio circuit and a cordless telephone. The telephone network (TN) 4 is, for example, a public switched telephone network. The data processing device (DPD) 2 is, for example, a personal computer.

The communication control device (CCD) 1 includes a ringer detection unit 11, a switching control unit 12, and a switching unit 13. The CCD 1 provides a function to connect the TU 3 to the TN 4 and provides a function to connect the DPD 2 to the TN 4. The ringer detection unit 11 provides a function to detect a ringer signal sent by the TN 4 to call the TU 3, and provides a function to detect an activation signal sent by the TN 4 prior to the ringer signal to notify the TU 3 of incoming of another signal. The switching control unit 12 provides a function to control the setting of the switching unit 13 in one of an ON state and an OFF state in accordance with the detection of the ringer signal by the ringer detection unit 11. The switching unit 13 provides a function to connect the TU 3 to the TN 4 or disconnect the TU 3 from the TN 4 in accordance with the control by the switching control unit 12.

In the communication support system of FIG. 1, the switching unit 13 connects the TU 3 through the transmission path of the CCD 1 to the TN 4 when the switching unit 13 is set in the ON state, and disconnects the TU 3 from the TN 4 by cutting off the transmission path when the switching unit 13 is set in the OFF state. The ringer detection unit 11 detects a ringer signal from the TN 4.

The DPD 2 includes a determination unit 21 which is connected to the switching control unit 12 of the CCD 1. The determination unit 21 determines, in response to the detection of the ringer signal by the ringer detection unit 11, whether the switching unit 13 is to be set in one of the ON state and the OFF state in accordance with switching control data stored in the DPD 2.

In the CCD 1, the switching control unit 12 controls setting of the switching unit 13 in one of the ON state and the OFF state in response to a control signal, indicative of the determination, sent by the determination unit 21 of the DPD 2. When the determination unit 21 makes the determination that the switching unit 13 is to be set in the ON state, in accordance with the switching control data, the determination unit 21 sends the control signal indicative of the determination to the CCD 1. The switching control unit 12 sets the switching unit 13 in the ON state in response to the control signal from the DPD 2, and the TU 3 is connected through the transmission path to the TN 4. The TU 3 outputs a ringing sound in accordance with the ringer signal sent by the TN 4.

Accordingly, in the communication support system of FIG. 1, it is possible to control the ringing sound on/off of the TU 3 in response to the ringer signal from the TN 4.

Figure 2:
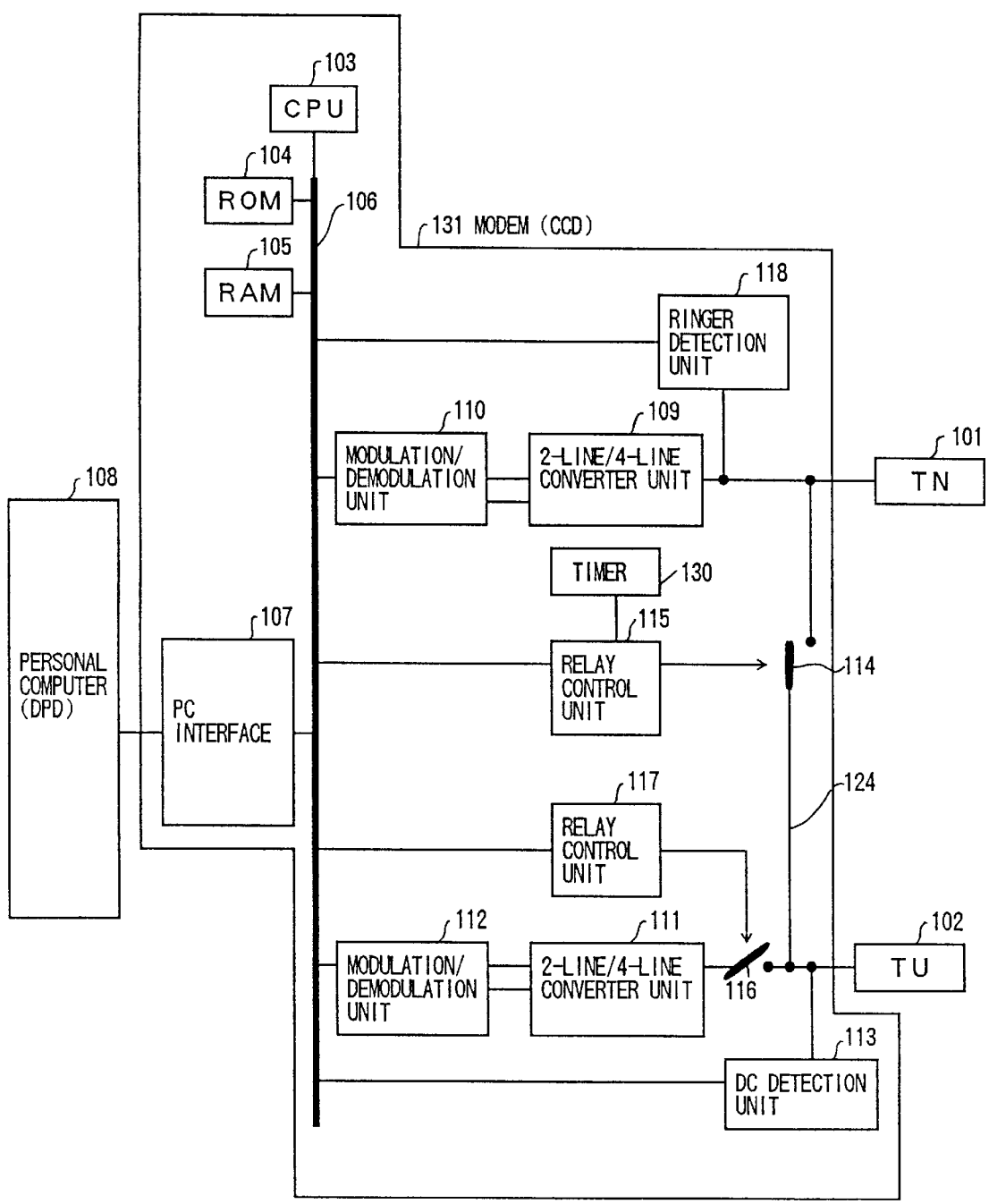
FIG. 2 is a block diagram illustrating a configuration of a first embodiment of a communication support system according to the present invention.

FIG. 2 shows a configuration of a first embodiment of a communication support system according to the present invention. The communication support system of FIG. 2 utilizes the embodiment of FIG. 1. In the present embodiment, the communication support system is capable of controlling a ringing sound on/off upon incoming of a call from the telephone network.

As shown in FIG. 2, the communication support system of the present embodiment generally has a telephone network 101, a telephone unit 102, a modem 131, and a personal computer 108. In FIG. 2, the telephone network 101, the telephone unit 102, the modem 131, and the personal computer 108, respectively, correspond to the TN 4, the TU 3, the CCD 1, and the DPD 2 in FIG. 1.

The telephone network 101 is, for example, a public switched telephone network (PSTN), and hereinafter it will be called the TN 101. The telephone unit 102 is, for example, a home-use telephone set which provides existing voice transmission and reception functions and an existing dialing function. Hereinafter, the telephone unit 102 will be called the TU 102. The TU 102 may include a radio circuit and a cordless telephone. Also, the personal computer 108 is, for example, a home-use personal computer, and hereinafter it will be called the DPD 108.

As shown in FIG. 2, the communication support system of the present embodiment is adapted to connect both the TU 102 and the DPD 108 through the modem 131 to the TN 101. The modem 131 is provided as the communication control device (DPD) in the communication support system of the present embodiment.

In the modem 131 of the present embodiment, there are provided a central processing unit (CPU) 103, a read-only memory (ROM) 104, a random access memory (RAM) 105, a bus 106, a personal-computer (PC) interface 107, a 2-line/4-line converter unit 109, a modulation/demodulation unit 110, a 2-line/4-line converter unit 111, a modulation/demodulation unit 112, a direct current (DC) detection unit 113, a relay 114, a relay control unit 115, a relay 116, a relay control unit 117, a ringer detection unit 118, and a timer 130. The modem 131 is capable of connecting the TU 102 to the TN 101 and disconnecting the TU 102 from the TN 101 through the relay 114 by using the CPU 103 and the relay control unit 115 and in accordance with a switching control signal supplied from the DPD 108.

In the present embodiment, when a power switch (not shown) of the communication support system and a power switch (not shown) of the modem 131 are turned ON, the relay 114 is initially set in an OFF state to cut off a transmission path 124 which connects the TN 101 and the TU 102 within the modem 131, so that the TU 102 is disconnected from the TN 101 by the relay 114.

In the modem 131 of the present embodiment, the CPU 103 receives signals from the elements of the modem 131 interconnected by the bus 106, and controls the elements of the modem 131 in accordance with the received signals. The CPU 103 executes a ringing sound control processing routine in which the relay control unit 115 is controlled so that the relay control unit 115 sets the relay 114 in an ON state or in an OFF state so as to connect the TU 102 to the TN 101 or disconnect the TU 102 from the TN 101 depending on the ON/OFF state of the relay 114.

The ROM 104 provides a storage area for storing the ringing sound control processing program executed by the CPU 103. The RAM 105 provides a storage area for storing control data and parameters used by the CPU 103 when the ringing sound control processing program is executed. The PC interface 107 provides a command interface between the DPD 108 and the bus 106 of the modem 131. For example, the DPD 108 issues a command to the CPU 103, and the command from the DPD 108 is transmitted through the PC interface 107 and the bus 106 to the CPU 103.

The 2-line/4-line converter unit 109 and the modulation/demodulation unit 110 provide a data modem function of the modem 131, which does not relate to the communication support system of the present embodiment. The 2-line/4-line converter unit 111 and the modulation/demodulation unit 112 provide a voice modem function of the modem 131, which does not relate to the communication support system of the present embodiment. The DC detection unit 113 monitors a change of direct current (DC) flowing through the TU 102 from an ON state to an OFF state. When such a change in the direct current flowing through the TU 102 is detected, the DC detection unit 113 recognizes an off-hook state of the TU 102. The DC detection unit 113 notifies the CPU 103 that the TU is set in the off-hook state.

The relay control unit 115 provides a function to control the setting of the relay 114 in one of the ON state and the OFF state under the control of the CPU 103. The relay control unit 115 corresponds to the switching control unit 12 in the embodiment of FIG. 1.

The relay 114 is a switching device which functions under the control of the relay control unit 115. That is, the relay 114 functions to connect the TU 102 through the transmission path 124 to the TN 101, and functions to disconnect the TU 102 from the TN 101 by cutting off the transmission path 124. More specifically, when the relay 114 is set in the ON state by the relay control unit 115, the TU 102 is connected to the TN 101 through the transmission path 124 within the modem 131. When the relay 114 is set in the OFF state by the relay control unit 115, the transmission path 124 within the modem 131 is cut off and the TU 102 is disconnected from the TN 101. Hence, the relay 114 is switched in the ON state to connect the TU 102 through the transmission path 124 to the TN 101 in a certain condition, and otherwise the relay 114 is switched in the OFF state to cut off the transmission path 124 and disconnect the TU 102 from the TN 101. The relay 114 corresponds to the switching unit 13 in the embodiment of FIG. 1.

The relay control unit 117 provides a function to control the setting of the relay 116 in one of an ON state and an OFF state under the control of the CPU 103. The relay 116 is a switching device which functions under the control of the relay control unit 117. That is, the relay 116 functions to connect a voice signal transmission path between the DPD 108 and the TU 102 when the voice modem function of the modem 131 is performed with the modulation/demodulation unit 112 and the 2-line/4-line converter unit 111. Otherwise the relay 116 functions to cut off the voice signal transmission path between the DPD 108 and the TU 102.

The ringer detection unit 118 provides a function to detect a ringer signal sent by the TN 101 to call the TU 102, and a function to detect an activation signal sent by the TN 101 prior to the ringer signal to notify the TU 102 of incoming of another signal. The ringer detection unit 118 corresponds to the ringer detection unit 11 in the embodiment of FIG. 1.

In the present embodiment, the ringer detection unit 118 determines whether a signal from the TN 101 is the ringer signal or the activation signal by detecting the characteristics of the waveform of the received signal. For example, the ringer signal, sent by the TN 101 to call the TU 102, has a waveform of 16 Hz, 75 V rms, and the ringer signal periodically turns ON for one second and turns OFF for two seconds. For example, the activation signal, sent by the TN 101 prior to the ringer signal to notify the TU 102 of incoming of a caller identification signal (which will be described later), has a waveform of 16 Hz, 75 V rms, and the activation signal periodically turns ON for 0.5 seconds and turns OFF for 0.5 seconds.

The timer 130 starts counting in response to detection of a ringer signal from the TN 101 by the ringer detection unit 118, and notifies the CPU 103 of the detection immediately after the timer 130 exceeds a predetermined time. Hence, the CPU 103 detects that the incoming call from the TN 101 has occurred, based on the notification sent to the CPU 103 by the timer 130 when the predetermined time has elapsed after the ringer signal was detected by the ringer detection unit 118.

Figure 7:
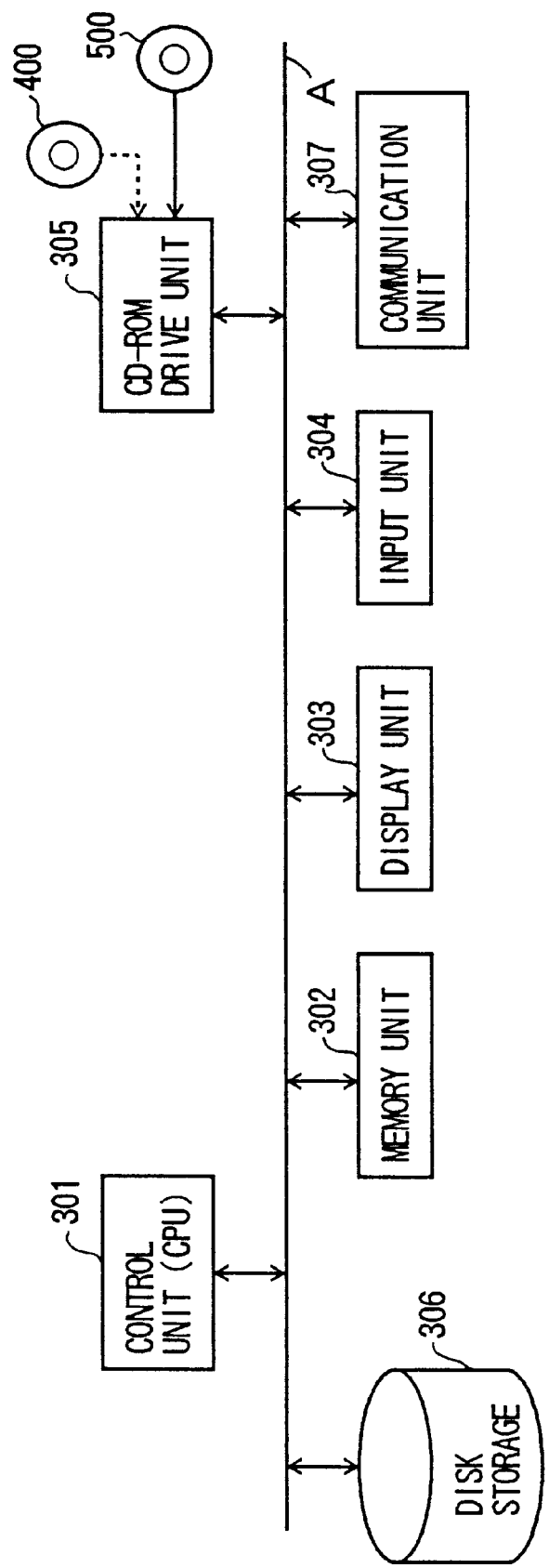
FIG. 7 is a diagram for explaining a configuration of elements of the data processing device in the communication support system of FIG. 2.

In the communication support system of the present embodiment, the personal computer 108 (or the DPD 108) has a configuration shown in FIG. 7.

As shown in FIG. 7, the DPD 108 generally has a control unit 301 (including a CPU), a memory unit 302, a display unit 303, an input unit 304, a CD-ROM drive unit 305, a disk storage 306, and a communication unit 307. The above elements of the DPD 108 are interconnected by a system bus A.

In the DPD 108 of FIG. 7, a determination processing procedure related to the switching control of the modem 131 is performed. When a ringer signal from the TN 101 is detected by the modem 131, the determination processing procedure is performed by the control unit 301 (or the CPU) in accordance with switching control data stored in the memory unit 302. By the determination processing procedure, the control unit 301 determines whether the relay 114 in the modem 131 is to be switched to one of the ON state and the OFF state in accordance with the switching control data.

In the DPD 108 of FIG. 7, the control unit 301 executes a determination processing program related to the switching control of the modem 131. When a ringer signal from the TN 101 is detected by the modem 131, the determination processing program is executed by the control unit 301 in accordance with the switching control data stored in the memory unit 302. By the determination processing program, the control unit 301 determines whether the relay 114 in the modem 131 is to be switched to one of the ON state and the OFF state in accordance with the switching control data. The control unit 301 corresponds to the determination unit 21 in the embodiment of FIG. 1.

The memory unit 302 includes a ROM (not shown) and a RAM (not shown). The ROM of the memory unit 302 provide a storage area for storing the determination processing program executed by the control unit 301. The RAM of the memory unit 302 provides a storage area for storing control data and parameters used by the control unit 301 when the determination processing program is executed.

The display unit 303 includes a cathode-ray-tube (CRT) monitor or a liquid-crystal-display (LCD) monitor. The display unit 303 provides a function to display various kinds of control information on the CRT or LCD monitor.

The input unit 304 includes a keyboard, a mouse, and other input devices. The communication unit 307 provides a function to receive a notification of various events sent by the modem 131, and provides a function to transmit various control signals to the modem 131. The system bus A of the DPD 108 is connected to the modem 131 through the PC interface 107 to allow the communication unit 307 to provide the receiving and transmission functions.

When the DPD 108 in the communication support system of the present embodiment is constructed, a CD-ROM (compact-disk read-only memory) 400 or a CD-ROM 500 is set in the CD-ROM drive unit 305. In the CD-ROM 400, the determination processing program is pre-recorded. In the CD-ROM 500, the ringing sound control processing program is pre-recorded.

When the DPD 108 in the communication support system of the present embodiment is constructed, the CD-ROM 400 is set in the CD-ROM drive unit 305, and the determination processing program is read from the CD-ROM 400 by using the CD-ROM drive unit 305 and installed into the disk storage 306 by the control unit 301. When the personal computer (DPD) 108 starts up, the determination processing program is read from the disk storage 306 and loaded into the memory unit 302. With the DPD 108 in such a condition, when a ringer signal from the TN 101 is detected by the modem 131, the determination processing program is executed by the control unit 301 in accordance with the switching control data stored in the memory unit 302.

In the communication support system of the present invention, the determination processing program (or one of the flowcharts of FIGS. 4, 11, 17, and 25) related to the determination of the switching control of the modem 131 is program code instructions stored in the CD-ROM 400. The CD-ROM 400 corresponds to a computer readable medium in the claims. The computer readable medium includes any one of instruction storage devices, such as, for example, magnetic disks including floppy disks, optical disks, magneto-optical disks including MOs, semiconductor memory cards, such as PC cards and miniature cards, and other types of computer usable devices and media.

Further, in the present embodiment, the memory unit 302 of the DPD 108 may store encoded or non-encoded instructions. The instructions may be installed from a floppy disk instead of the CD-ROM 400 to the disk storage 306 of the DPD 108 first, transferred to the ROM or RAM of the memory unit 302 and then read by the control unit 301. Such a memory of the DPD 108 may store either all or part of the program code instructions related to the determination processing program. Alternatively, the program code instructions of the determination processing program may be installed in the ROM 104 of the modem 131. In such a case, the ROM 104 corresponds to a computer readable medium in the claims.

When the DPD 108 in the communication support system of the present embodiment is constructed, the CD-ROM 500 is set in the CD-ROM drive unit 305, and the ringing sound control processing program is read from the CD-ROM 500 by the control unit 301 by using the CD-ROM drive unit 305, and downloaded into the ROM 104 and the RAM 105 of the modem 131 by the control unit 301 and the CPU 103 through the system bus A, the PC interface 107, and the bus 106. With the modem 131 in such a condition, when a ringer signal from the TN 101 is detected by the modem 131, the ringing sound control processing program is executed by the CPU 103 which controls the relay control unit 115 so that the relay control unit 115 sets the relay 114 in one of the ON state and the OFF state so as to connect the TU 102 to the TN 101 or disconnect the TU 102 from the TN 101 depending on the ON/OFF state of the relay 114.

In the communication support system of the present invention, the ringing sound control processing program (or one of the flowcharts of FIGS. 3, 6, 10, 13–16, 20, and 23) is program code instructions stored in the CD-ROM 500. The CD-ROM 500 corresponds to a computer readable medium in the claims. The computer readable medium includes any one of instruction storage devices, such as, for example, magnetic disks including floppy disks, optical disks, magneto-optical disks including MOs, semiconductor memory cards, such as PC cards and miniature cards, and other types of computer usable devices and media.

Further, in the present embodiment, the ROM 104 and the RAM 105 of the modem 131 may store encoded or non-encoded instructions. The instructions may be installed from a floppy disk instead of the CD-ROM 500 to the disk storage 306 of the DPD 108 first, transferred to the ROM 104 or RAM 105 of the modem 131 and then read by the CPU 103. Such a memory of the modem 131 may store either all or part of the program code instructions related to the ringing sound control processing program.

Next, a description will be given of various routines performed by the communication control device or the data processing device in the communication support system of FIG. 2 with reference to FIG. 3 through FIG. 6.

Figure 3:
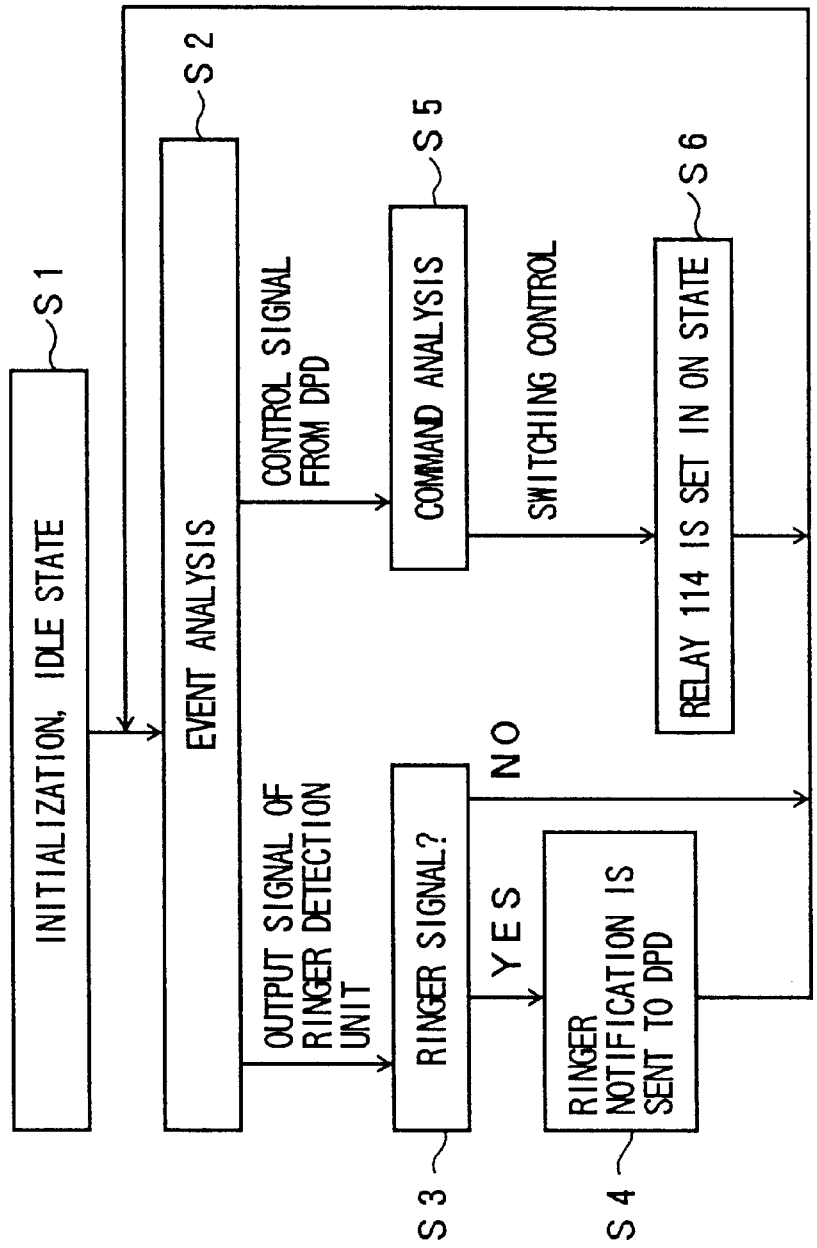
FIG. 3 is a flowchart for explaining a ringing sound control processing routine executed by a communication control device in the communication support system of FIG. 2.

FIG. 3 shows a ringing sound control processing routine executed by the communication control device (or the modem 131) in the communication support system of FIG. 2. The ringing sound control processing routine of FIG. 3 may be provided in the modem 131 by using the CD-ROM 500.

As shown in FIG. 3, at the start of the ringing sound control processing, the program code instructions cause the CPU 103 to be initialized and placed in an idle state (S1). Various registers and variables of the modem 131 are initialized, and the relay 114 is initially set in the OFF state. During the idle state, the CPU 103 waits for an event. The event includes the detection of a ringer signal by the ringer detection unit 118, the detection of an off-hook state of the TU 102 by the DC detection unit 113, and the reception of a control signal sent by the DPD 108.

With the modem 131 in such a condition, when any event has occurred, the program code instructions cause the CPU 103 to analyze the event (S2). When a call from the TN 101 is incoming, the ringer detection unit 118 detects the ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S3).

When the result at the step S3 is negative, the program code instructions cause the CPU 103 to go back to the step S2. When the result at the step S3 is affirmative, the program code instructions cause the CPU 103 to send a notification of the detection of the ringer signal to the DPD 108 through the PC interface 107 (S4). After the step S4 is performed, the CPU 103 goes back to the step S2.

When the reception of a control signal sent by the DPD 108 has occurred in the step S2, the program code instructions cause the CPU 103 to analyze the control signal (S5). When it is detected as the result of the step S5 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 of the modem 131 to the TN 101 (S6). When the control signal does not indite the determination, the program code instructions cause the CPU 103 to perform a corresponding procedure for. the control signal. After the step S6 is performed, the CPU 103 goes back to the step S2.

In the communication support system of the present embodiment, the relay 114 is set in the ON state upon incoming of the call from the TN 101 by the above ringing sound control processing, and the TU 102 is connected through the transmission path 124 to the TN 101. Hence, the TU 102 outputs a ringing sound in response to the ringer signal from the TN 101.

Figures 4, 5:
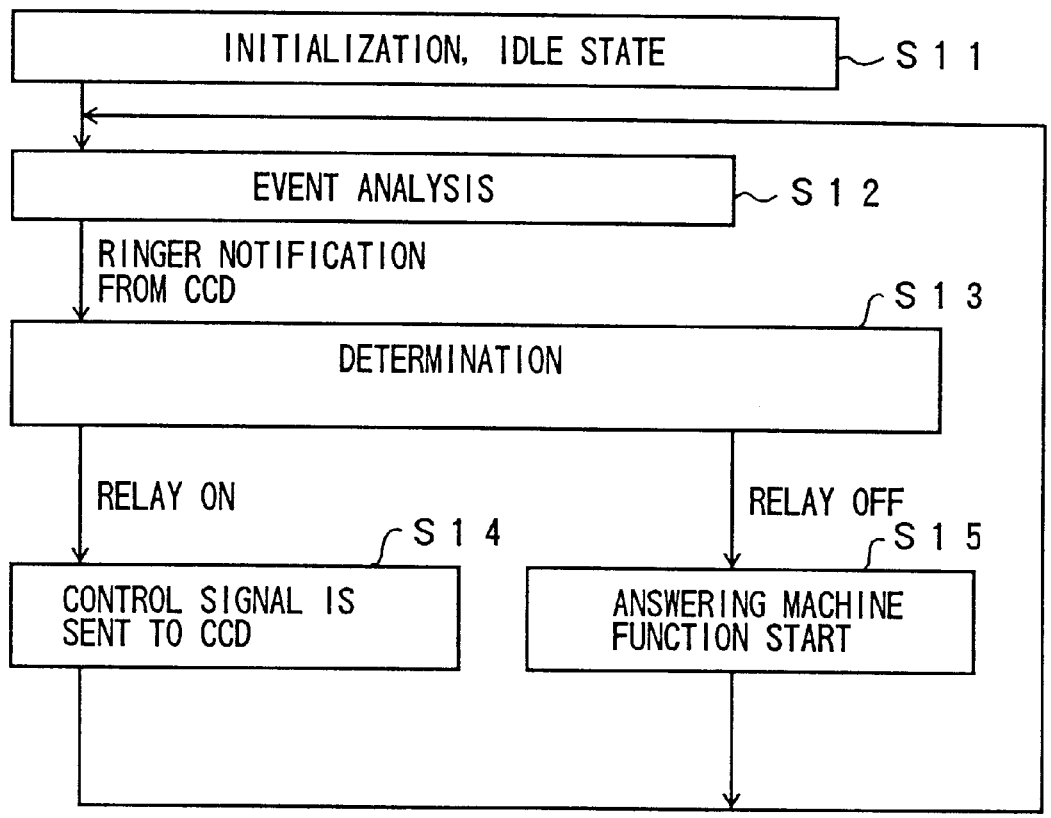
FIG. 4 is a flowchart for explaining a determination processing routine executed by a data processing device in the communication support system of FIG. 2.
FIG. 5 is a diagram for explaining an example of a first switching control data table stored in the communication support system of FIG. 2.

FIG. 4 shows a determination processing routine executed by the data processing device (or the DPD 108) in the communication support system of FIG. 2. The determination processing routine of FIG. 4 may be provided in the DPD 108 by using the CD-ROM 400.

As shown in FIG. 4, at the start of the determination processing, the program code instructions cause the control unit 301 to be initialized and placed in an idle state (S11). Various registers and variables of the DPD 108 are initialized. During the idle state, the control unit 301 waits for an event. The event includes the notification of the detection of a ringer signal sent to the DPD 108 by the modem 131.

With the DPD 108 in such a condition, when an event has occurred, the program code instructions cause the control unit 301 to analyze the event (S12). When the notification of the detection of the ringer signal is sent to the DPD 108 by the modem 131, the program code instructions cause the control unit 301 to determine whether the relay 114 of the modem 131 is to be set in one of the ON state and the OFF state in accordance with a first switching control data table stored in the memory unit 302 (S13).

FIG. 5 shows an example of the first switching control data table stored in the memory unit 302 of the DPD 108. As shown in FIG. 5, in the first switching control data table, a correlation between readout of an internal timer of the personal computer 108 at the time (S13) of the detection of the ringer signal and switching control for setting the relay 114 in one of the ON state and the OFF state is defined. In the example of FIG. 5, when the readout of the internal timer of the DPD 108 upon incoming of a call from the TN 101 is between 0:00 and 6:00, the determination is made by the control unit 301 to set the relay 114 in the OFF state. When the readout of the internal timer of the DPD 108 upon incoming of a call from the TN 101 is between 6:00 and 24:00, the determination is made by the control unit 301 to set the relay 114 in the ON state. Hence, it is possible for the communication support system of the present embodiment to set the ringing sound output of the TU 102 in an OFF state when a call is sent from the TN 101 to the TU 102 at midnight, and set the ringing sound output of the TU 102 in an ON state when a call is sent during other time periods.

In the step S13, when the readout of the internal timer of the DPD 108 at the time of the notification of the detection of the ringer signal is between 6:00 and 24:00, the determination is made by the control unit 301 to set the relay 114 in the ON state in accordance with the first switching control data table of FIG. 5. In this case, the program code instructions cause the control unit 301 to send a control signal indicative of the determination to the modem 131 through the PC interface 107 (S14).

On the other hand, when the readout of the internal timer of the DPD 108 at the time of the notification of the detection of the ringer signal is between 0:00 and 6:00, the determination in the step S13 is made by the control unit 301 to set the relay 114 in the OFF state in accordance with the first switching control data table of FIG. 5. In this case, the program code instructions cause the control unit 301 to send a control signal indicative of the determination to the modem 131 through the PC interface 107 and start performing an answering machine function (S15). In the modem 131, the relay 114 is set in the OFF state, and the TU 102 is disconnected from the TN 101 by cutting off the transmission path 124. The DPD 108 transmits a pre-recorded answering message to the TN 101 through the PC interface 107 during the performance of the answering machine function.

After the step S14 or the step S15 is performed, the program code instructions cause the control unit 301 to go back to the step S12.

Figure 6:
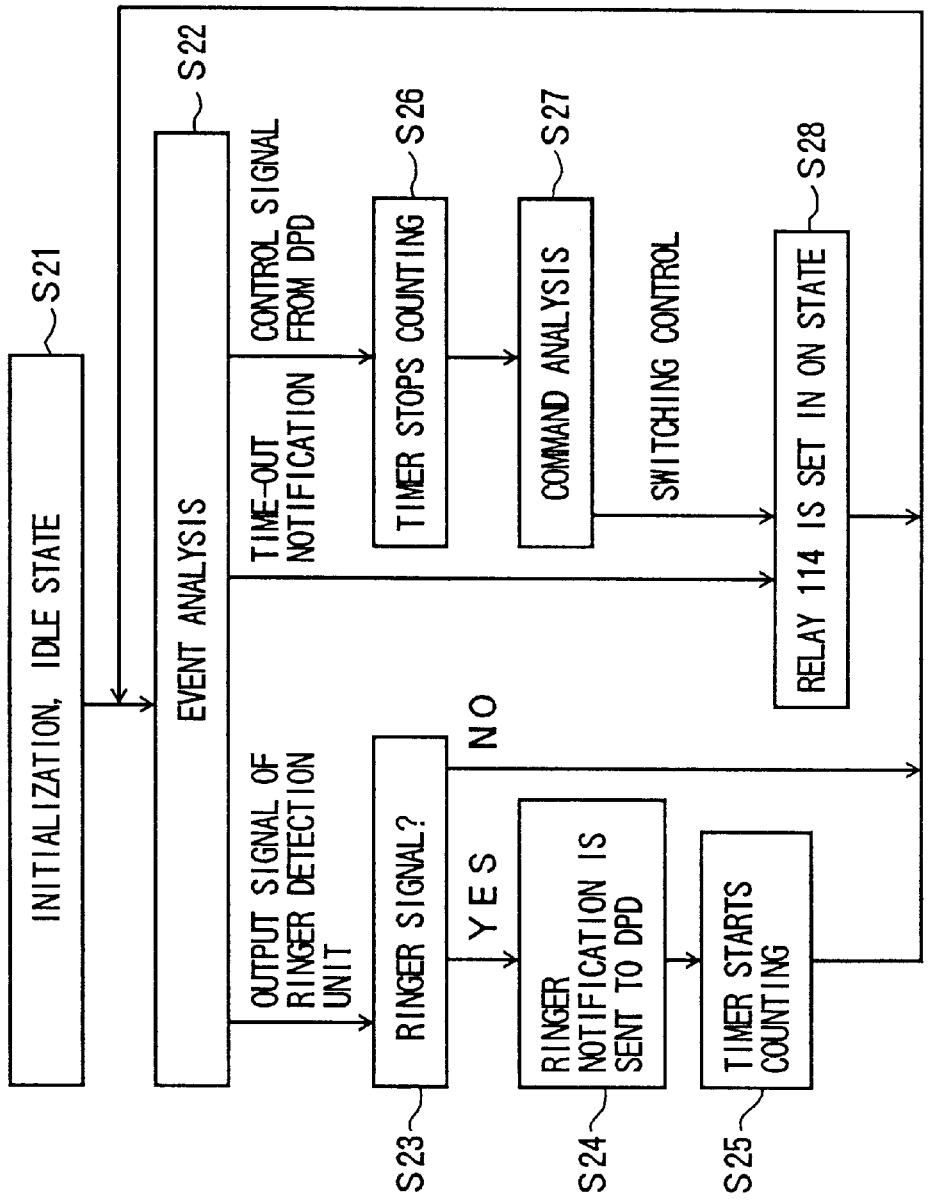
FIG. 6 is a flowchart for explaining a ringing sound control processing routine executed by the communication control device in the communication support system of FIG. 2.

FIG. 6 shows another ringing sound control processing routine executed by the communication control device (or the modem 131) in the communication support system of FIG. 2. The ringing sound control processing routine of FIG. 6 may be provided in the modem 131 by using the CD-ROM 500.

As shown in FIG. 6, at the start of the ringing sound control processing, the program code instructions cause the CPU 103 to be initialized and placed in an idle state (S21). The various registers and variables of the modem 131 are initialized, and the relay 114 is initially set in the OFF state. During the idle state, the CPU 103 waits for an event. The event includes the detection of a ringer signal by the ringer detection unit 118, the detection of an off-hook state of the TU 102 by the DC detection unit 113, the reception of a control signal sent by the DPD 108, and the reception of a time-out notification output by the timer 130.

With the modem 131 in such a condition, when an event has occurred, the program code instructions cause the CPU 103 to analyze the event (S22). When a call from the TN 101 is incoming, the ringer detection unit 118 detects the ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S23).

When the result at the step S23 is negative, the program code instructions cause the CPU 103 to go back to the step S22. When the result at the step S23 is affirmative, the program code instructions cause the CPU 103 to send a notification of the detection of the ringer signal to the DPD 108 through the PC interface 107 (S24). Further, the program code instructions cause the CPU 103 to activate the timer 130 so as to start counting in response to the detection of the ringer signal by the ringer detection unit 118 (S25). The timer 130 outputs a time-out notification to the CPU 103 after the timer 130 exceeds a predetermined time. In the present embodiment, the predetermined time of the timer 130 is set at three seconds. After the step S25 is performed, the CPU 103 goes back to the step S22.

When the reception of a control signal sent by the DPD 108 has occurred in the step S22, the program code instructions cause the CPU 103 to deactivate the timer 130 so as to stop counting at the reception of the control signal (S26). Further, the program code instructions cause the CPU 103 to analyze the control signal (S27). When it is detected as the result of the step S27 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 of the modem 131 to the TN 101 (S28). When the control signal does not indicate the determination, the program code instructions cause the CPU 103 to perform a corresponding procedure for the control signal. After the step S28 is performed, the CPU 103 goes back to the step S22.

Further, in the present embodiment, when the reception of the time-out notification output by the timer 130 has occurred in the step S22, the program code instructions cause the CPU 103 to perform the step S28. The steps S26 and S27 are not performed. In this case, the CPU 103 receives no control signal from the DPD 108 after the predetermined time of the timer 130 has elapsed. The CPU 103 forcefully controls the relay control unit 115 so that the relay control unit 115 sets the relay 114 in the ON state to connect the TU 102 through the transmission path 124 of the modem 131 to the TN 101.

In the communication support system of the present embodiment, the relay 114 is set in the ON state upon incoming of the call from the TN 101 by either the control signal sent by the DPD 108 or the forceful switching control by the CPU 103, and the TU 102 is connected through the transmission path 124 to the TN 101. Hence, the TU 102 outputs a ringing sound in response to the ringer signal from the TN 101.

Accordingly, by performing the determination processing routine of FIG. 4 on the DPD 108 and one of the ringing sound control processing routines of FIG. 3 and FIG. 6 on the modem 131 in a parallel manner, it is possible for the communication support system of the present embodiment to control the ringing sound on/off of the TU 102 in response to the ringer signal from the TN 101. For example, it is possible to set the ringing sound output of the TU 102 in the OFF state and perform the answering machine function when a call is sent from the TN 101 to the TU 102 at midnight.

Next, FIG. 8 shows another embodiment of the communication support system incorporating the principles of the present invention.

As shown in FIG. 8, the communication support system includes a caller ID detection unit 14 provided in the CCD 1, in addition to the elements of the embodiment of FIG. 1. In FIG. 8, the elements which are the same as corresponding elements in FIG. 1 are designated by the same reference numerals, and a description thereof will be omitted.

In the embodiment of FIG. 8, the caller ID detection unit 14 detects a caller identification (CID) signal sent to the CCD 1 by the TN 4 prior to a ringer signal, and notifies the DPD 2 of the detection of the CID signal from the TN 4.

Similar to the embodiment of FIG. 1, in the communication support system of FIG. 8, the switching unit 13 connects the TU 3 through the transmission path of the CCD 1 to the TN 4 when the switching unit 13 is set in the ON state, and disconnects the TU 3 from the TN 4 by cutting off the transmission path when the switching unit 13 is set in the OFF state. The ringer detection unit 11 detects a ringer signal from the TN 4.

The DPD 2 includes the determination unit 21 which is connected to the switching control unit 12 of the CCD 1. Hence, the determination unit 21 of FIG. 8 is capable of carrying out the same function as the determination unit 21 in the embodiment of FIG. 1.

In addition, the determination unit 21 is connected to the caller ID detection unit 14 of the CCD 1 via an interface (not shown in FIG. 8) between the DPD 2 and the CCD 1. In the present embodiment, the determination unit 21 determines, in response to the detection of the CID signal by the caller ID detection unit 14, whether the switching unit 13 is to be set in one of the ON state and the OFF state in accordance with a second switching control data table stored in the DPD 2. See FIG. 12 for the second switching control data table, which will be described later.

In the CCD 1, the switching control unit 12 controls the setting of the switching unit 13 in one of the ON state and the OFF state in response to a control signal, indicative of the determination, sent by the determination unit 21 of the DPD 2. When the determination unit 21 makes the determination that the switching unit 13 is to be set in the ON state, in accordance with the second switching control data table, the determination unit 21 sends the control signal indicative of the determination to the CCD 1. The switching control unit 12 sets the switching unit 13 in the ON state in response to the control signal from the DPD 2. In this condition, the TU 3 is connected through the transmission path to the TN 4. Since a ringer signal is sent to the CCD 1 by the TN 4 following the CID signal, the TU 3 outputs a ringing sound in accordance with the ringer signal sent by the TN 4.

Accordingly, in the communication support system of FIG. 8, it is possible to control the ringing sound on/off of the TU 3 in response to the CID signal sent by the TN 4 prior to the ringer signal. Further, it is possible for the communication support system of FIG. 8 to control the ringing sound on/off of the TU 3 in response to the ringer signal sent by the TN 4. Hence, the communication support system of FIG. 8 can control the ringing sound on/off of the telephone unit in response to a call (either the CID signal or the ringer signal) from the telephone network.

Figure 9:
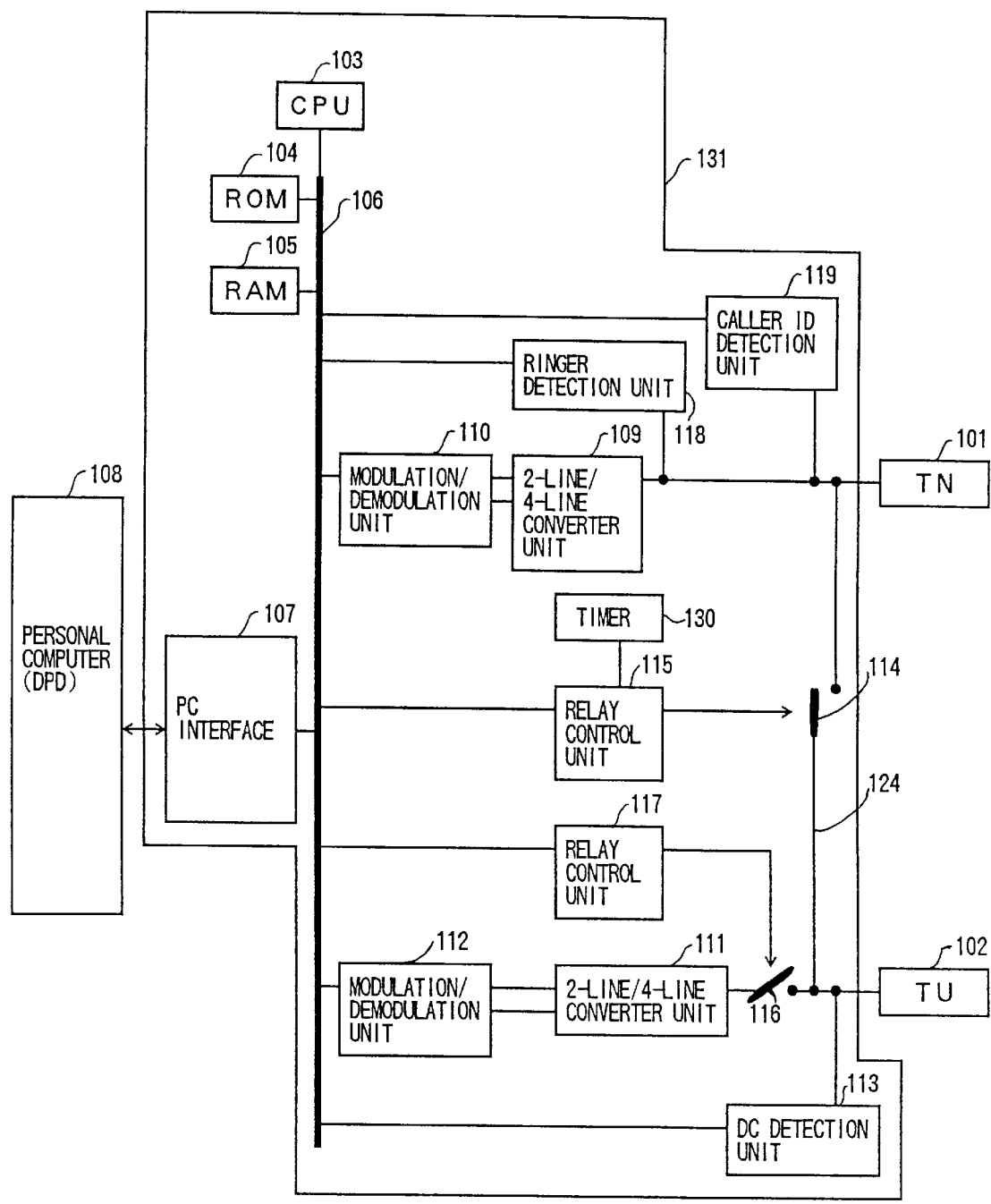
FIG. 9 is a block diagram illustrating a configuration of a second embodiment of the communication support system according to the present invention.

FIG. 9 shows a configuration of a second embodiment of the communication support system according to the present invention. The communication support system of FIG. 9 utilizes the embodiment of FIG. 8. In the present embodiment, the communication support system is capable of controlling a ringing sound on/off of the telephone unit in response to a call from the telephone network.

In FIG. 9, the elements which are the same as corresponding elements in FIG. 2 are designated by the same reference numerals, and a description thereof will be omitted.

As shown in FIG. 9, the communication support system of the present embodiment includes a caller ID detection unit 119 provided in the modem 131, in addition to the elements of the embodiment of FIG. 2. The caller ID detection unit 119 provides a function to detect a caller identification signal (or CID signal) sent by the TN 101 prior to a ringer signal. The caller ID detection unit 119 corresponds to the caller ID detection unit 14 in the embodiment of FIG. 8. The DC detection unit 113 provides a function to detect an off-hook state of the TU 102. The ringer detection unit 118 provides a function to detect a ringer signal from the TN 101. Other elements of the modem 131 provide functions which are the same as the functions of the corresponding elements of the embodiment of FIG. 2.

In the communication support system of the present embodiment, the personal computer 108 (or the DPD 108)

has the configuration shown in FIG. 7. The DPD 108 of FIG. 9 has the elements which are the same as corresponding elements of the DPD 108 of FIG. 7, and a description thereof will be omitted.

Figure 10:
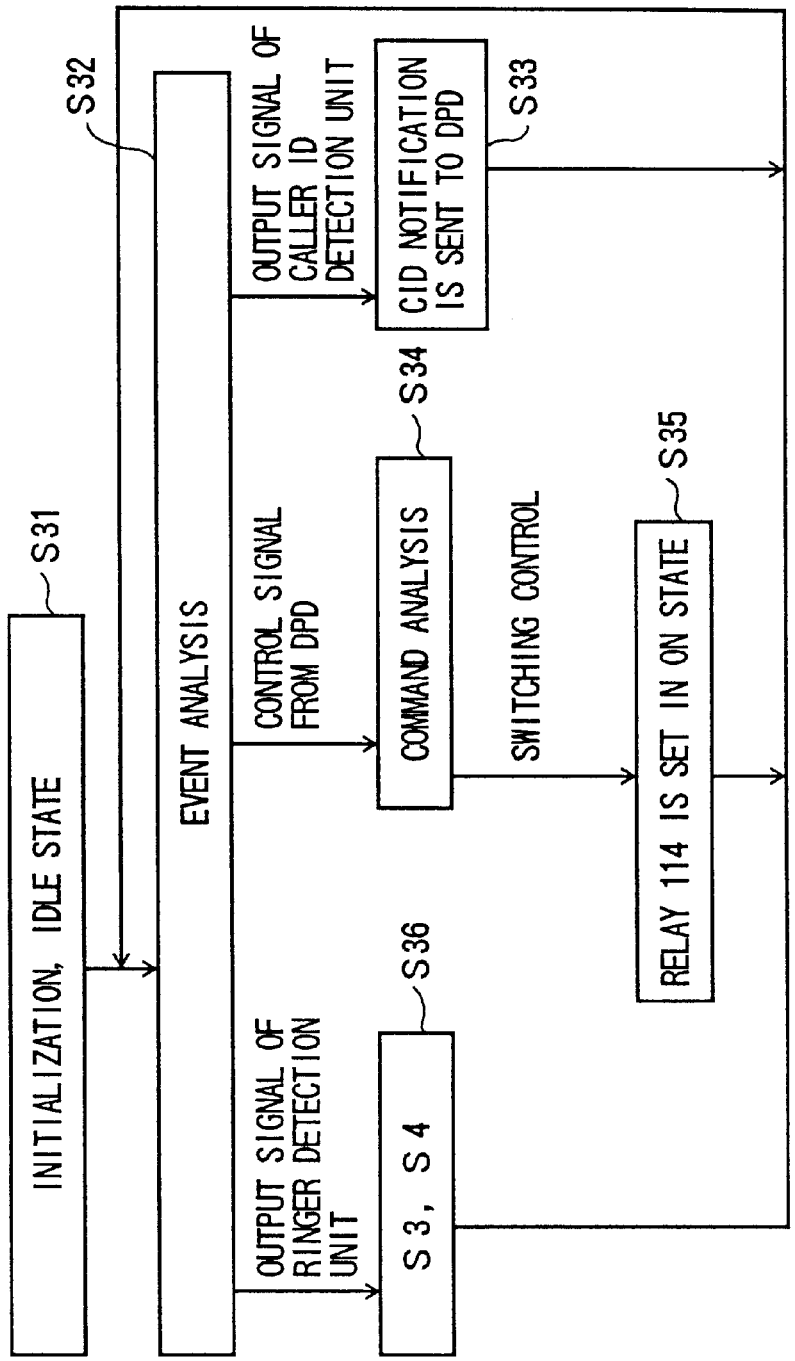
FIG. 10 is a flowchart for explaining a ringing sound control processing routine executed by a communication control device in the communication support system of FIG. 9.
Figures 11, 12:
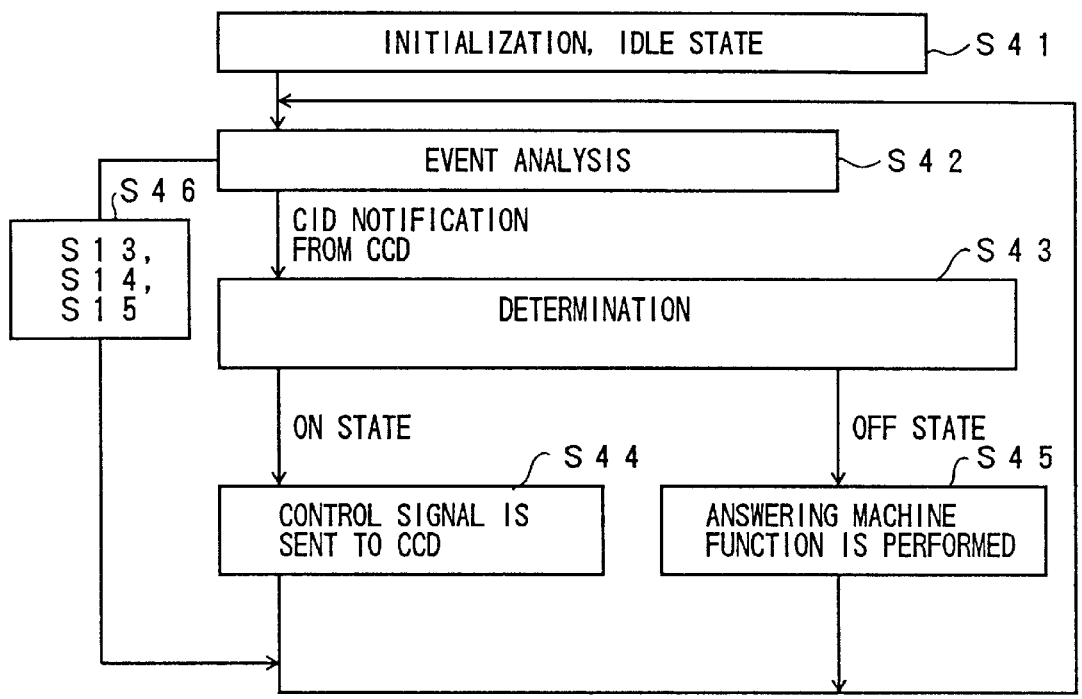
FIG. 11 is a flowchart for explaining a determination processing routine executed by a data processing device in the communication support system of FIG. 9.
FIG. 12 is a diagram for explaining an example of a second switching control data table stored in the communication support system of FIG. 9.

Similar to the embodiment of FIG. 2, in the communication support system of the present embodiment, a ringing sound control processing routine of FIG. 10 and a determination processing routine of FIG. 11 are executed by the modem 131 and the DPD 108 in parallel. In the present embodiment, it is possible to control the ringing sound on/off of the TU 102 in response to a call from the TN 101.

FIG. 10 shows a ringing sound control processing routine executed by the communication control device (or the modem 131) in the communication support system of FIG. 9. The ringing sound control processing routine of FIG. 10 may be provided in the modem 131 by using the CD-ROM 500.

As shown in FIG. 10, at the start of the ringing sound control processing, the program code instructions cause the CPU 103 to be initialized and placed in an idle state (S31). The registers and variables of the modem 131 are initialized, and the relay 114 is initially set in the OFF state. During the idle state, the CPU 103 waits for an event. The event includes the detection of a ringer signal by the ringer detection unit 118, the detection of a CID signal by the caller ID detection unit 119, the detection of an off-hook state of the TU 102 by the DC detection unit 113, and the reception of a control signal sent by the DPD 108.

With the modem 131 in such a condition, when an event has occurred, the program code instructions cause the CPU 103 to analyze the event (S32). When a call from the TN 101 is incoming, the caller ID detection unit 119 detects a CID signal from the TN 101 and notifies the CPU 103 of the detection of the CID signal. In this case, the program code instructions cause the CPU 103 to send a CID notification to the DPD 108 through the PC interface 107 (S33). After the step S33 is performed, the CPU 103 goes back to the step S32.

In a case in which a caller identification notification service is not used by the telephone user, the CID signal is not sent from the TN 101 and only a ringer signal is sent from the TN 101 upon incoming of a call. In this case, the ringer detection unit 118 detects a ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S36). The CPU 103 performs the step S36 in the same manner as the steps S3 and S4 in the embodiment of FIG. 3. That is, when the result at the step S36 is negative, the program code instructions cause the CPU 103 to go back to the step S32. When the result at the step S36 is affirmative, the program code instructions cause the CPU 103 to send a ringer notification to the DPD 108 through the PC interface 107. After the step S36 is performed, the CPU 103 goes back to the step S32.

When the reception of a control signal sent by the DPD 108 has occurred in the step S32, the program code instructions cause the CPU 103 to analyze the control signal (S34). When it is detected as the result of the step S34 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 to the TN 101 (S35). In this condition, the TU 102 is connected through the transmission path 124 to the TN 101. Since a ringer signal is sent by the TN 101 following the CID signal, the TU 102 outputs a ringing sound in accordance with the ringer signal from the TN 101. In another case, the program code instructions cause the CPU 103 to perform a corresponding procedure for the control signal. After the step S35 is performed, the CPU 103 goes back to the step S32.

FIG. 11 shows a determination processing routine executed by the data processing device (or the DPD 108) in the communication support system of FIG. 9. The determination processing routine of FIG. 11 may be provided in the DPD 108 by using the CD-ROM 400.

As shown in FIG. 11, at the start of the determination processing, the program code instructions cause the control unit 301 to be initialized and placed in an idle state (S41). The registers and variables of the DPD 108 are initialized. During the idle state, the control unit 301 waits for an event. The event includes the reception of a ringer notification from the modem 131, and the reception of a CID notification from the modem 131.

With the DPD 108 in such a condition, when an event has occurred, the program code instructions cause the control unit 301 to analyze the event (S42). When a CID notification from the modem 131 is received at the step S42, the program code instructions cause the control unit 301 to determine whether the relay 114 of the modem 131 is to be set in one of the ON state and the OFF state in accordance with the second switching control data table (FIG. 12) stored in the DPD 108 (S43).

FIG. 12 shows an example of the second switching control data table stored in the memory unit 302 of the DPD 108 of FIG. 9. As shown in FIG. 12, in the second switching control data table, a correlation between a caller ID (the phone number), a caller profile (the caller name), and switching control for setting the relay 114 in one of the ON state and the OFF state is defined for each of a plurality of predetermined caller IDs. The caller ID (the phone number) is given to the control unit 301 by the CID notification from the modem 131. In the example of FIG. 12, when the caller ID given to the control unit 301 at the step S43 matches with "044-AAA-BBBB" in the second switching control data table, the determination is made by the control unit 301 to set the relay 114 in the ON state. When the caller ID matches with "078-CCC-DDDD" in the second switching control data table, the determination is made by the control unit 301 to set the relay 114 in the OFF state. Hence, it is possible for the communication support system of the present embodiment to set the ringing sound output of the TU 102 in an ON state only when a call is sent from the TN 101 by a specific caller, and set the ringing sound output of the TU 102 in an OFF state when a call is sent from the TN 101 by callers other than the specific one.

In the step S43, when the caller ID of the CID notification matches with, for example, "044-AAA-BBBB", the determination is made by the control unit 301 to set the relay 114 in the ON state in accordance with the second switching control data table of FIG. 12. In this case, the program code instructions cause the control unit 301 to send a control signal indicative of the determination to the modem 131 through the PC interface 107 (S44).

On the other hand, when the caller ID of the CID notification matches with, for example, "078-CCC-DDDD", the determination at the step S43 is made by the control unit 301 to set the relay 114 in the OFF state in accordance with the second switching control data table of FIG. 12 In this case, the program code instructions cause the control unit 301 to send a control signal indicative of the determination to the modem 131 through the PC interface 107 and starts performing an answering machine function (S45). In the modem 131, the relay 114 is set in the OFF state, and the TU 102 is disconnected from the TN 101 by cutting off the transmission path 124. In the step S45, the DPD 108 transmits a pre-recorded answering message to the TN 101 through the PC interface 107 by the performance of the answering machine function.

After the step S44 or the step S45 is performed, the control unit 301 goes back to the step S42.

When a ringer notification from the modem 131 is received at the step S42, the program code instructions cause the control unit 301 to determine whether the relay 114 of the modem 131 is to be set in one of the ON state and the OFF state in accordance with the first switching control data table (FIG. 5) stored in the DPD 108 (S46). In this case, the control unit 301 performs the step S46 in the same manner as the steps S13, S14 and S15 in the embodiment of FIG. 4. A duplicate description will be omitted.

Accordingly, in the communication support system of the present embodiment, it is possible to set the ringing sound on/off of the TU 102 in response to a call from the TN 101. Further, it is possible for the communication support system of the present embodiment to set the ringing sound output of the TU 102 in the ON state only when a call is sent from the TN 101 by a specific caller, and set the ringing sound output of the TU 102 in the OFF state when a call is sent from the TN 101 by callers other than the specific one.

Figure 13:
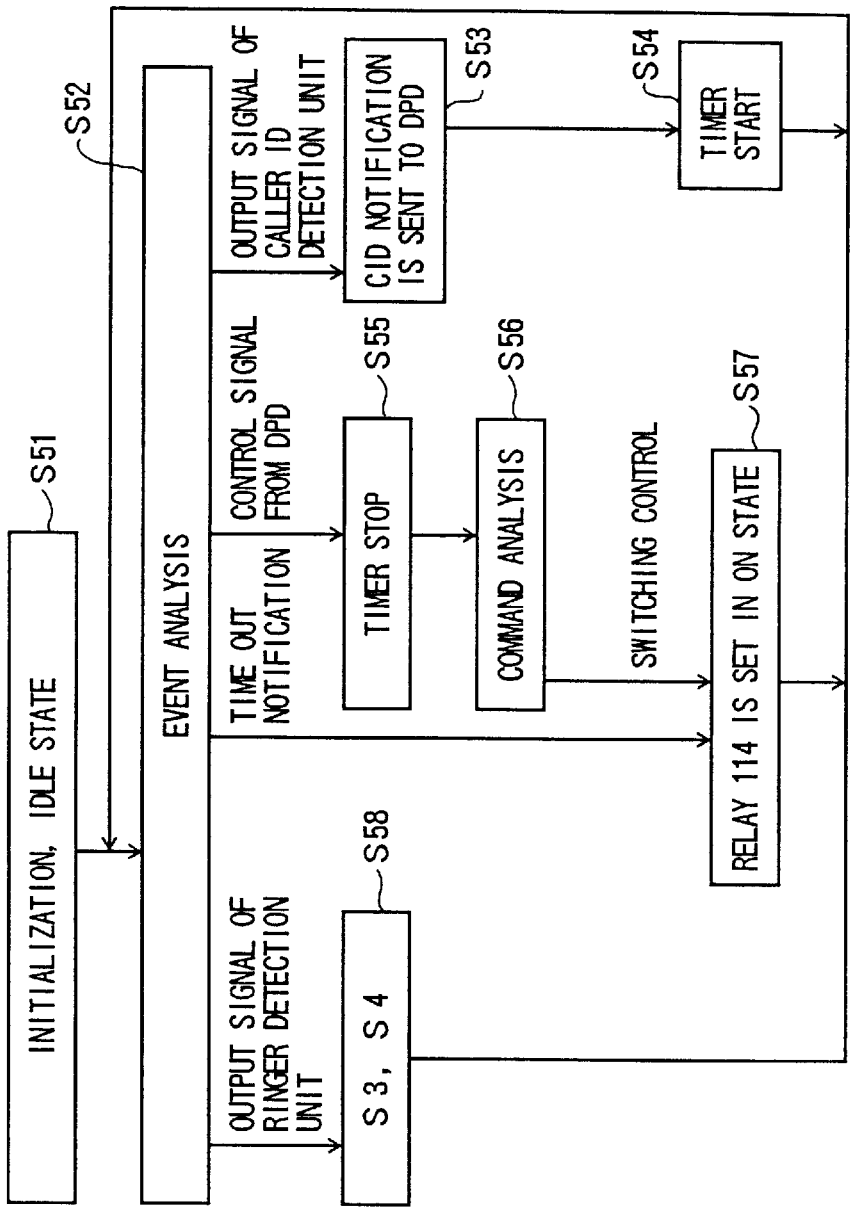
FIG. 13 is a flowchart for explaining a ringing sound control processing routine executed by the communication control device of FIG. 9.

FIG. 13 shows another ringing sound control processing routine executed by the communication control device (or the modem 131) in the communication support system of FIG. 9. The ringing sound control processing routine of FIG. 13 may be provided in the modem 131 of FIG. 9 by using the CD-ROM 500.

As shown in FIG. 13, at the start of the ringing sound control processing, the program code instructions cause the CPU 103 to be initialized and placed in an idle state (S51). The registers and variables of the modem 131 are initialized, and the relay 114 is initially set in the OFF state. During the idle state, the CPU 103 waits for an event. The event includes the detection of a ringer signal by the ringer detection unit 118, the detection of a CID signal by the caller ID detection unit 119, the detection of an off-hook state of the TU 102 by the DC detection unit 113, the reception of a control signal sent by the DPD 108, and the reception of a time-out notification sent by the timer 130. The time-out notification of the timer 130 will be described later.

With the modem 131 in such a condition, when an event has occurred, the program code instructions cause the CPU 103 to analyze the event (S52). When a call from the TN 101 is incoming, the caller ID detection unit 119 detects a CID signal from the TN 101 and notifies the CPU 103 of the detection of the CID signal. In this case, the program code instructions cause the CPU 103 to send a CID notification to the DPD 108 through the PC interface 107 (S53). After the step S53 is performed, the program code instructions cause the CPU 103 to start counting of the timer 130 (S54). In the present embodiment, the timer 130 starts counting in response to the detection of a CID signal from the TN 101 by the caller ID detection unit 119, and sends a time-out notification to the CPU 103 immediately after the timer 130 exceeds 3 seconds. The time of the timer 130 may be set at another time period instead of 3 seconds. After the step S54 is performed, the CPU 103 goes back to the step S52.

In a case in which a caller identification notification service is not used by the telephone user, the CID signal is not sent from the TN 101 and only a ringer signal is sent from the TN 101 upon incoming of a call. In this case, the ringer detection unit 118 detects a ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S58). The CPU 103 performs the step S58 in the same manner as the steps S3 and S4 in the embodiment of FIG. 3, and a duplicate description will be omitted. After the step S58 is performed, the CPU 103 goes back to the step S52.

When the reception of a control signal sent by the DPD 108 has occurred in the step S52 before a time-out notification is sent by the timer 130, the program code instructions cause the CPU 103 to stop counting of the timer 130 (S55). Further, the program code instructions cause the CPU 103 to analyze the control signal (S56). When it is detected as the result of the step S56 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 to the TN 101 (S57). In this condition, the TU 102 is connected through the transmission path 124 to the TN 101. Since a ringer signal is sent by the TN 101 following the CID signal, the TU 102 outputs a ringing sound in accordance with the ringer signal from the TN 101. In another case, the program code instructions cause the CPU 103 to perform a corresponding procedure for the control signal. After the step S57 is performed, the CPU 103 goes back to the step S52.

In the present embodiment, when no control signal is sent by the DPD 108 within the time period of 3 seconds and the reception of a time-out notification from the timer 130 has occurred in the step S52, the program code instructions cause the CPU 103 to forcefully control the relay control unit 115 so that the relay control unit 115 sets the relay 114 in the ON state to connect the TU 102 through the transmission path 124 to the TN 101 (S57). In this case, the CPU 103 does not respond to a control signal sent by the DPD 108. With the modem 131 in this condition, the TU 102 is connected through the transmission path 124 to the TN 101. The TU 102 outputs a ringing sound in accordance with a ringer signal sent by the TN 101 following the CID signal. After the step S57 is performed, the CPU 103 goes back to the step S52.

Accordingly, in the communication support system of the present embodiment, it is possible to set the ringing sound on/off of the TU 102 in response to a call from the TN 101. It is possible for the communication support system of the present embodiment to set the ringing sound output of the TU 102 in the ON state only when a call is sent from the TN 101 by a specific caller, and set the ringing sound output of the TU 102 in the OFF state when a call is sent from the TN 101 by callers other than the specific one. Further, it is possible for the communication support system of the present embodiment to efficiently control the ringing sound on/off of the TU 102 in response to a call from the TN 101 so as to conform with the calling procedure of the TN 101.

Figure 14:
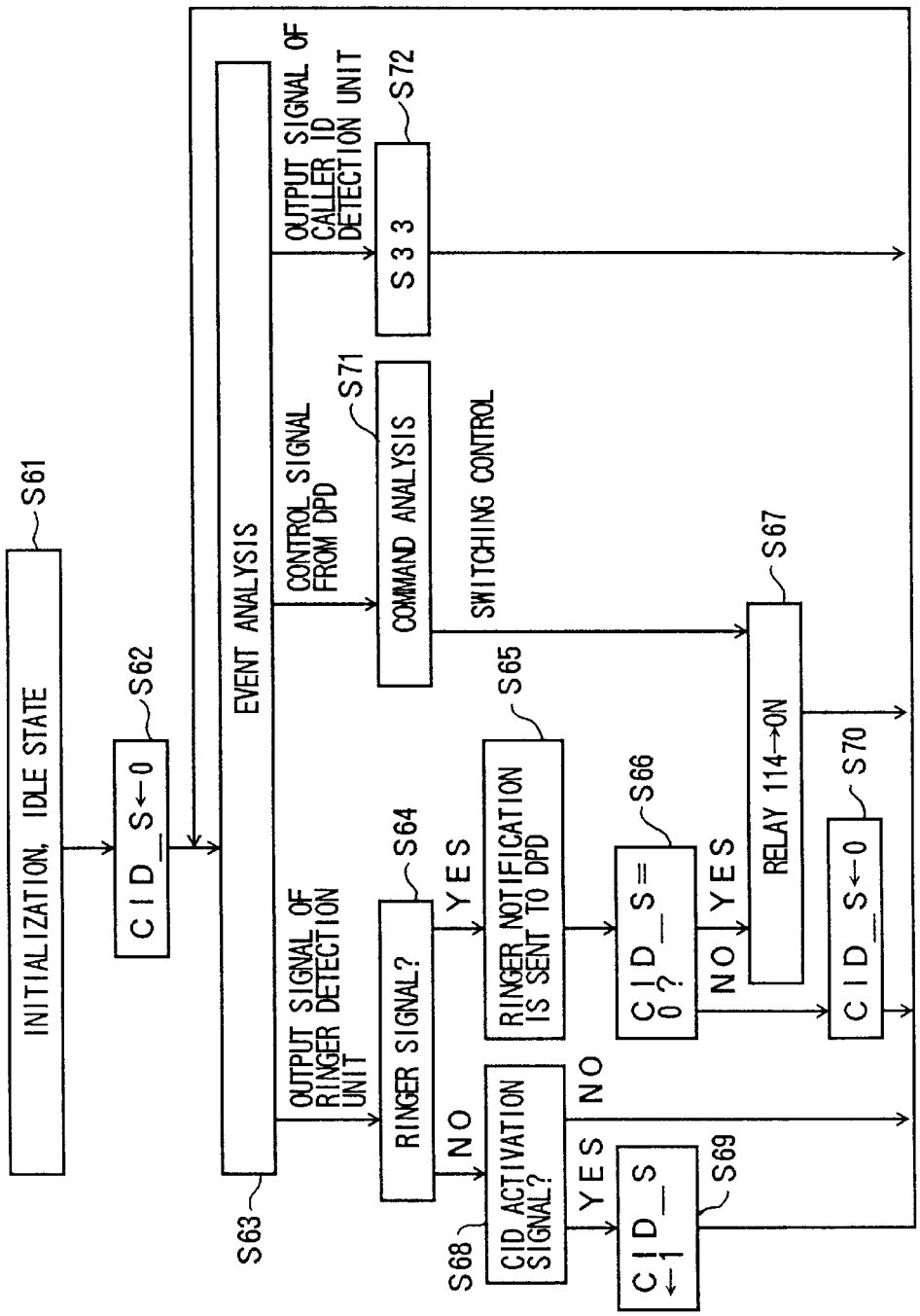
FIG. 14 is a flowchart for explaining another ringing sound control processing routine executed by the communication control device of FIG. 9.

FIG. 14 shows still another ringing sound control processing routine executed by the communication control device (the modem 131) in the communication support system of FIG. 9. The ringing sound control processing routine of FIG. 14 may be provided in the modem 131 of FIG. 9 by using the CD-ROM 500.

As shown in FIG. 14, at the start of the ringing sound control processing, the program code instructions cause the CPU 103 to be initialized and placed in an idle state (S61). The registers and variables of the modem 131 are initialized, and the relay 114 is initially set in the OFF state. During the idle state, the CPU 103 waits for an event. The event includes the detection of a ringer signal by the ringer detection unit 118, the detection of a CID signal by the caller ID detection unit 119, the detection of an off-hook state of the TU 102 by the DC detection unit 113, and the reception of a control signal sent by the DPD 108.

After the step S61 is performed, the program code instructions cause the CPU 103 to set a state variable "CID_S" at zero (S62). When the state variable CID_S is set at zero, it indicates that a ringer signal is sent from the TN 101 to call the TU 102 and no CID signal is send from the TN 101. When the state variable CID_S is set at one, it indicates that an activation signal is sent from the TN 101 prior to the ringer signal to notify the TU 102 of incoming of a CID signal.

With the modem 131 in such a condition, when an event has occurred, the program code instructions cause the CPU 103 to analyze the event (S63). When a call from the TN 101 is incoming, the caller ID detection unit 119 detects a CID signal from the TN 101 and notifies the CPU 103 of the detection of the CID signal. In this case, the program code instructions cause the CPU 103 to send a CID notification to the DPD 108 through the PC interface 107 (S72). In the present embodiment, the CPU 103 performs the step S72 in the same manner as in the embodiment of FIG. 10. After the step S72 is performed, the CPU 103 goes back to the step S63.

In a case in which a caller identification notification service is not used by the telephone user, the CID signal is not sent from the TN 101 and only a ringer signal is sent from the TN 101 upon incoming of a call. In this case, the ringer detection unit 118 detects a ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S64).

When the result at the step S64 is negative, the program code instructions cause the CPU 103 to determine whether the received signal from the TN 101 is the CID activation signal sent to notify the TU 102 of incoming of a CID signal, by detecting the characteristics of the waveform of the received signal by using the ringer detection unit 118 (S68).

When the result at the step S68 is negative, the CPU 103 goes back to the step S63. When the result at the step S68 is affirmative, the program code instructions cause the CPU 103 to set the state variable "CID_S" at one (S69). After the step S69 is performed, the CPU 103 goes back to the step S63.

On the other hand, when the result at the step S64 is affirmative, the program code instructions cause the CPU 103 to send a ringer notification to the DPD 108 through the PC interface 107 (S65). The program code instructions cause the CPU 103 to determine whether the state variable "CID_S" is equal to zero (S66). When the result at the step S66 is negative (CID_S=1), it is determined that the caller identification notification service is used by the telephone user. In this case, the program code instructions cause the CPU 103 to reset the state variable "CID_S" to zero (S70). After the step S70 is performed, the CPU 103 goes back to the step S63.

When the result at the step S66 is affirmative (CID_S=0), it is determined that the caller identification notification service is not used by the telephone user. In this case, the program code instructions cause the CPU 103 to control the relay control unit 115 so that the relay control unit 115 sets the relay 114 in the ON state to connect the TU 102 through the transmission path 124 to the TN 101 (S67). After the step S67 is performed, the CPU 103 goes back to the step S63.

When the reception of a control signal sent by the DPD 108 has occurred in the step S63, the program code instructions cause the CPU 103 to analyze the control signal (S71). When it is detected as the result of the step S71 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 to the TN 101 (S67). In this condition, the TU 102 is connected through the transmission path 124 to the TN 101. Since a ringer signal is sent by the TN 101 following the CID signal, the TU 102 outputs a ringing sound in accordance with the ringer signal from the TN 101. In another case, the program code instructions cause the CPU 103 to perform a corresponding procedure for the control signal. After the step S67 is performed, the CPU 103 goes back to the step S63.

Accordingly, in the communication support system of the present embodiment, it is possible to set the ringing sound on/off of the TU 102 in response to a call from the TN 101. Further, it is possible for the communication control device (the modem 131) of the present embodiment to determine whether the caller identification notification service is used by the telephone user, and forcefully control the ringing sound output of the TU 102 in the ON state in response to the call from the TN 101 if the caller identification notification service is not used.

Figure 15:
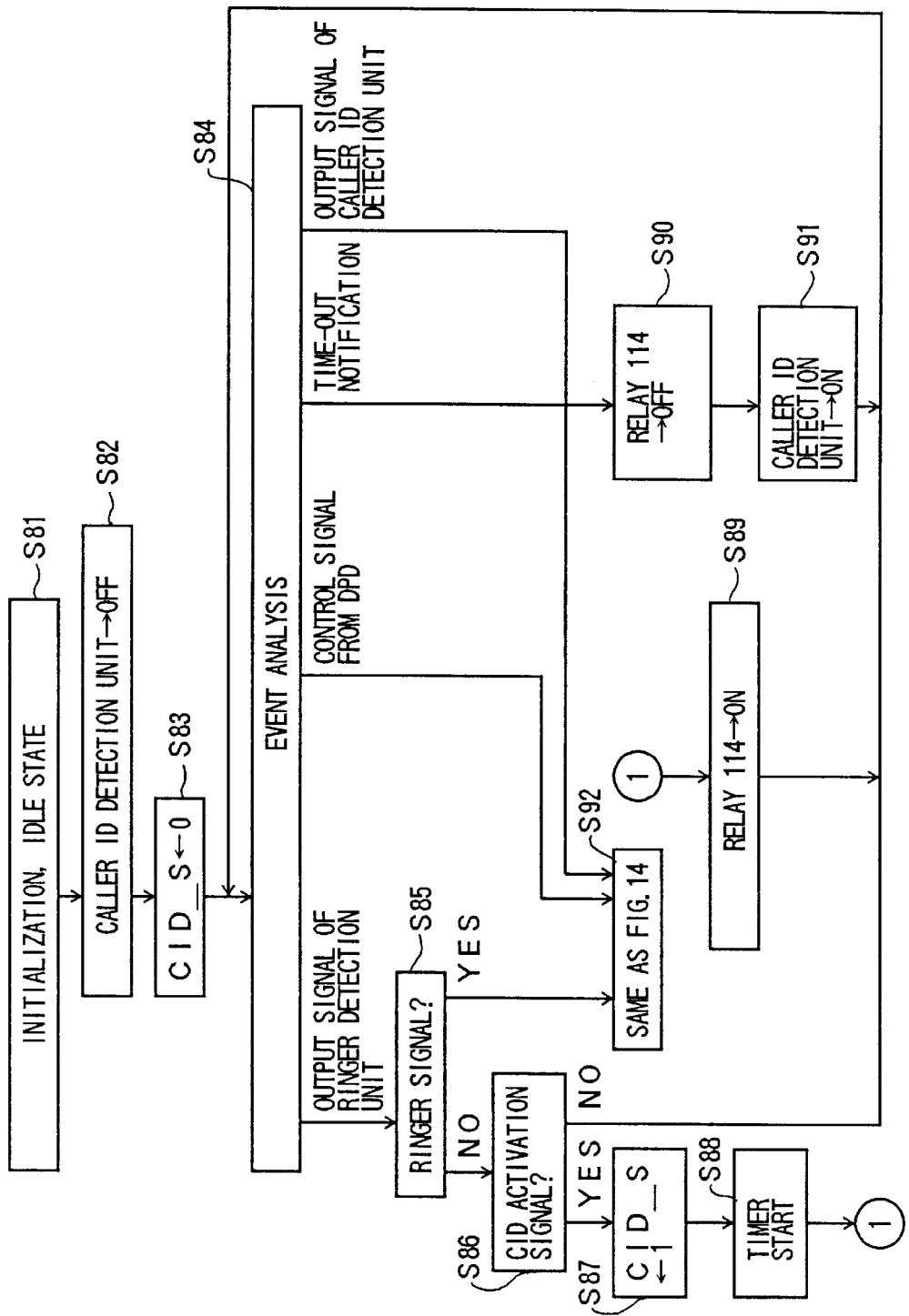
FIG. 15 is a flowchart for explaining a further ringing sound control processing routine executed by the communication control device of FIG. 9.

FIG. 15 shows a further ringing sound control processing routine executed by the communication control device (the modem 131) in the communication support system of FIG. 9. The ringing sound control processing routine of FIG. 15 may be provided in the modem 131 of FIG. 9 by using the CD-ROM 500.

As shown in FIG. 15, at the start of the ringing sound control processing, the program code instructions cause the CPU 103 to be initialized and placed in an idle state (S81). The registers and variables of the modem 131 are initialized, and the relay 114 is initially set in the OFF state. During the idle state, the CPU 103 waits for an event. The event includes the detection of a ringer signal by the ringer detection unit 118, the detection of a CID signal by the caller ID detection unit 119, the detection of an off-hook state of the TU 102 by the DC detection unit 113, the reception of a control signal sent by the DPD 108, and the reception of a time-out notification sent by the timer 130.

After the step S81 is performed, the program code instructions cause the CPU 103 to set the caller ID detection unit 119 in an OFF state (S82). That is, in the modem 131, the caller ID detection unit 119 is initially disconnected from the TN 101.

After the step S82 is performed, the program code instructions cause the CPU 103 to set the state variable "CID_S" at zero (S83). Similar to the embodiment of FIG. 14, when the state variable CID_S is set at zero, it indicates that a ringer signal is sent from the TN 101 to call the TU 102 and no CID signal is send from the TN 101. When the state variable CID_S is set at one, it indicates that an activation signal is sent from the TN 101 prior to the ringer signal to notify the TU 102 of incoming of a CID signal.

With the modem 131 in such a condition, when an event has occurred, the program code instructions cause the CPU 103 to analyze the event (S84). When a call from the TN 101 is incoming, the caller ID detection unit 119 detects a CID signal from the TN 101 and notifies the CPU 103 of the detection of the CID signal. In this case, the program code instructions cause the CPU 103 to send a CID notification to the DPD 108 through the PC interface 107 (S92). In the present embodiment, the CPU 103 performs the step S92 in the same manner as in the embodiment of FIG. 14. After the step S92 is performed, the CPU 103 goes back to the step S84.

In a case in which a caller identification notification service is not used by the telephone user, the CID signal is not sent from the TN 101 and only a ringer signal is sent from the TN 101 upon incoming of a call. In this case, the ringer detection unit 118 detects a ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S85).

When the result at the step S85 is negative, the program code instructions cause the CPU 103 to determine whether the received signal from the TN 101 is the CID activation signal sent to notify the TU 102 of incoming of a CID signal, by detecting the characteristics of the waveform of the received signal by using the ringer detection unit 118 (S86).

When the result at the step S86 is negative, the CPU 103 goes back to the step S84. When the result at the step S86 is affirmative, the program code instructions cause the CPU 103 to set the state variable "CID_S" at one (S87), and the program code instructions cause the CPU 103 to start counting of the timer 130 (S88). In the present embodiment, the timer 130 starts counting in response to the detection of a CID activation signal from the TN 101 by the ringer detection unit 118, and sends a time-out notification to the CPU 103 immediately after the timer 130 exceeds 2 seconds. The time of the timer 130 may be set at another time period instead of 2 seconds. After the step S88 is performed, the program code instructions cause the CPU 103 to forcefully control the relay control unit 115 so that the relay control unit 115 sets the relay 114 in the ON state to connect the TU 102 through the transmission path 124 to the TN 101 (S89). In this condition, the TU 102 is connected through the transmission path 124 to the TN 101. Since. the CID activation signal from the TN 101 is sent to the TU 102 through the transmission path 124 of the modem 131, the TU 102 outputs a different ringing sound in accordance with the CID activation signal from the TN 101 until the timer 130 exceeds 2 seconds. After the step S89 is performed, the CPU 103 goes back to the step S84.

On the other hand, when the result at the step S85 is affirmative, the program code instructions cause the CPU 103 to perform the step S92. The CPU 103 performs the step S92 in the same manner as in the embodiment of FIG. 14. After the step S92 is performed, the CPU 103 goes back to the step S84.

When the reception of a time-out notification sent by the timer 130 has occurred in the step S84, the program code instructions cause the CPU 103 to forcefully control the relay control unit 115 so that the relay control unit 115 sets the relay 114 in the OFF state to disconnect the TU 102 from the TN 101 (S90). After the step S90 is performed, the program code instructions cause the CPU 103 to set the caller ID detection unit 119 in the ON state (S91). After the step S91 is performed, the CPU 103 goes back to the step S84.

When the reception of a control signal sent by the DPD 108 has occurred in the step S84, the program code instructions cause the CPU 103 to perform the step S92. The CPU 103 performs the step S92 in the same manner as in the embodiment of FIG. 14. After the step S92 is performed, the CPU 103 goes back to the step S84.

Accordingly, in the communication support system of the present embodiment, it is possible to set the ringing sound on/off of the TU 102 in response to a call from the TN 101. Further, it is possible for the communication control device (the modem 131) of the present embodiment to allow the TU 102 to output a different ringing sound in accordance with the CID activation signal from the TN 101 for the time period of the timer 130 when the CID activation signal is detected by the ringer detection unit 118.

Figure 16:
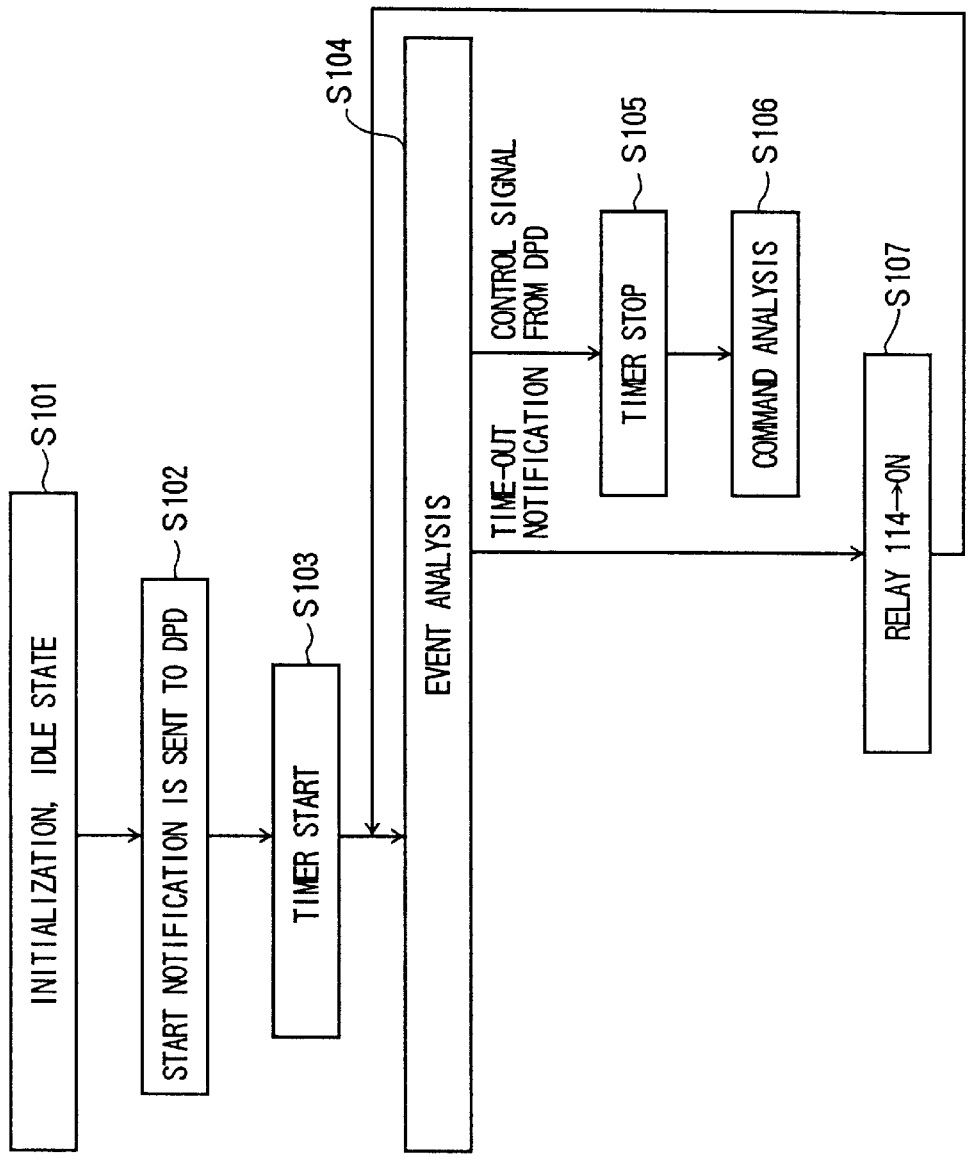
FIG. 16 is a flowchart for explaining another ringing sound control processing routine executed by the communication control device of FIG. 9.

FIG. 16 shows another ringing sound control processing routine executed by the communication control device (the modem 131) in the communication support system of FIG. 9. The ringing sound control processing routine of FIG. 16 may be provided in the modem 131 of FIG. 9 by using the CD-ROM 500.

As shown in FIG. 15, at the start of the ringing sound control processing, the program code instructions cause the CPU 103 to be initialized and placed in an idle state (S101). The registers and variables of the modem 131 are initialized, and the relay 114 is initially set in the OFF state. During the idle state, the CPU 103 waits for an event. The event includes the reception of a control signal sent by the DPD 108, and the reception of a time-out notification sent by the timer 130.

After the step S101 is performed, the program code instructions cause the CPU 103 to send a start notification to the DPD 108 through the PC interface 107 (S102).

After the step S102 is performed, the program code instructions cause the CPU 103 to start counting of the timer 130 (S103). In the present embodiment, the timer 130 starts counting in response to the initialization of the modem 131, and sends a time-out notification to the CPU 103 immediately after the timer 130 exceeds 3 seconds. The time of the timer 130 may be set at another time period instead of 3 seconds.

With the modem 131 in such a condition, when an event has occurred, the program code instructions cause the CPU 103 to analyze the event (S104). When the reception of a control signal sent by the DPD 108 has occurred in the step S104 before a time-out notification is sent by the timer 130, the program code instructions cause the CPU 103 to stop counting of the timer 130 (S105). Further, the program code instructions cause the CPU 103 to analyze the control signal (S106). When it is detected as the result of the step S106 that the control signal indicates a response notification sent by the DPD 108 in response to the start notification, the program code instructions cause the CPU 103 to maintain the relay 114 in the OFF state.

In the present embodiment, when no control signal is sent by the DPD 108 within the time period of 3 seconds and the reception of a time-out notification from the timer 130 has occurred in the step S104, the program code instructions cause the CPU 103 to forcefully control the relay control unit 115 so that the relay control unit 115 sets the relay 114 in the ON state to connect the TU 102 through the transmission path 124 to the TN 101 (S107). In this case, it is determined that the DPD 108 is not operating normally. The CPU 103 does not respond to a control signal sent by the DPD 108 but forcefully sets the relay 114 in the ON state. With the modem 131 in this condition, the TU 102 is connected through the transmission path 124 to the TN 101. After the step S107 is performed, the CPU 103 goes back to the step S104.

Accordingly, it is possible for the communication support system of the present embodiment to efficiently control the ringing sound on/off of the TU 102 in response to a call from the TN 101. In the communication support system of the present embodiment, it is possible to prevent the delay of operation of the modem 131 due to a malfunction in the DPD 108.

FIG. 17 shows a determination processing routine executed by the data processing device (the DPD 108) in the communication support system of FIG. 9 in parallel with the ringing signal control processing routine of FIG. 16. The determination processing routine of FIG. 17 may be provided in the DPD 108 by using the CD-ROM 400.

As shown in FIG. 17, at the start of the determination processing, the program code instructions cause the control unit 301 to be initialized and placed in an idle state (S111). The registers and variables of the DPD 108 are initialized. During the idle state, the control unit 301 waits for an event. The event includes the reception of a start notification from the modem 131.

With the DPD 108 in such a condition, when an event has occurred, the program code instructions cause the control unit 301 to analyze the event (S112). When a start notification from the modem 131 is received at the step S112, the program code instructions cause the control unit 301 to send a response notification to the modem 131 through the PC interface 107 (S113). After the step S113 is performed, the control unit 301 goes back to the step S112.

Accordingly, in the communication support system of the present embodiment, it is possible to send a response notification back to the modem 131 in response to a start notification from the modem 131. The start notification is sent from the modem 131 to the DPD 108 when the initialization of the modem 131 is performed. It is possible for the communication support system of the present embodiment to efficiently control the ringing sound on/off of the TU 102 in response to a call from the TN 101. In the communication support system of the present embodiment, it is possible to prevent the delay of operation of the modem 131 due to a malfunction in the DPD 108.

Figure 18:
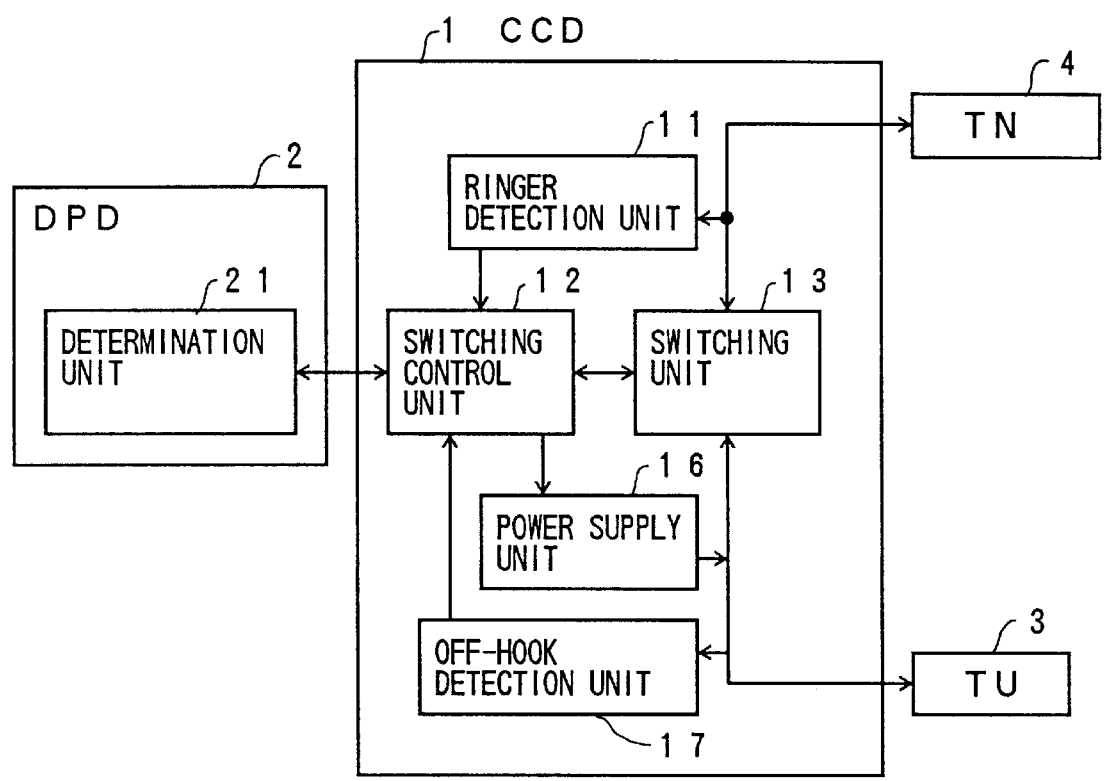
FIG. 18 is a block diagram of a further embodiment incorporating the principles of the present invention.

Next, FIG. 18 shows a further embodiment of the communication support system incorporating the principles of the present invention.

As shown in FIG. 18, the communication support system includes a power supply unit 16 and an off-hook detection unit 17, in addition to the elements of the embodiment of FIG. 1. In FIG. 18, the elements which are the same as corresponding elements in FIG. 1 are designated by the same reference numerals, and a description thereof will be omitted.

In the embodiment of FIG. 18, the off-hook detection unit 17 provides a function to detect an off-hook state of the TU 3. The power supply unit 16 provides a function to supply power to the TU 3 when the transmission path of the CCD 1 is cut off by the switching unit 13 and supplying of power from the TN 4 to the TU 3 is inhibited.

Similar to the embodiment of FIG. 1, in the communication support system of FIG. 18, the switching unit 13 connects the TU 3 through the transmission path of the CCD 1 to the TN 4 when the switching unit 13 is set in the ON state, and disconnects the TU 3 from the TN 4 by cutting off the transmission path when the switching unit 13 is set in the OFF state. The ringer detection unit 11 detects a ringer signal from the TN 4.

The DPD 2 includes the determination unit 21 which is connected to the switching control unit 12 of the CCD 1. The determination unit 21 determines, in response to the detection of the ringer signal by the ringer detection unit 11, whether the switching unit 13 is to be set in one of the ON state and the OFF state in accordance with the first switching control data table stored in the DPD 2.

In the CCD 1, the switching control unit 12 controls setting of the switching unit 13 in one of the ON state and the OFF state in response to the control signal, indicative of the determination, sent by the determination unit 21 of the DPD 2. When the determination unit 21 makes the determination that the switching unit 13 is to be set in the ON state, in accordance with the first switching control data table, the determination unit 21 sends the control signal indicative of the determination to the CCD 1. The switching control unit 12 sets the switching unit 13 in the ON state in response to the control signal from the DPD 2, and the TU 3 is connected through the transmission path to the TN 4. The TU 3 outputs a ringing sound in accordance with the ringer signal sent by the TN 4.

Further, in the communication support system of FIG. 18, the power supply unit 16 supplies power to the TU 3 when the switching unit 13 is set in the OFF state by the switching control unit 12 to cut off the transmission path and inhibit supplying of power from the TN 4 to the TU 3. With the CCD 1 in such a condition, the off-hook detection unit 17 detects an off-hook state of the TU 3. When the off-hook state of the TU 3 is detected, the switching control unit 12 sets the switching unit 13 in the ON state. Then the TU 3 is connected through the transmission path to the TN 4. It is possible for the telephone user on the TU 3 to send a call to the TN 4 through the CCD 1.

In the communication support system of FIG. 18, when the switching unit 13 is set in the ON state, the power supply unit 16 is disconnected from the TU 3, and the power from the TN 4 is supplied through the transmission path to the TU 3.

Accordingly, in the communication support system of FIG. 18, it is possible to control the ringing sound on/off of the TU 3 in response to the ringer signal from the TN 4. Further, it is possible for the communication support system of FIG. 18 to supply power to the TU 3 by using the power supply unit 16 when the switching unit 13 is set in the OFF state by the switching control unit 12 to cut off the transmission path and inhibit the supplying of power from the TN 4 to the TU 3.

Figure 19:
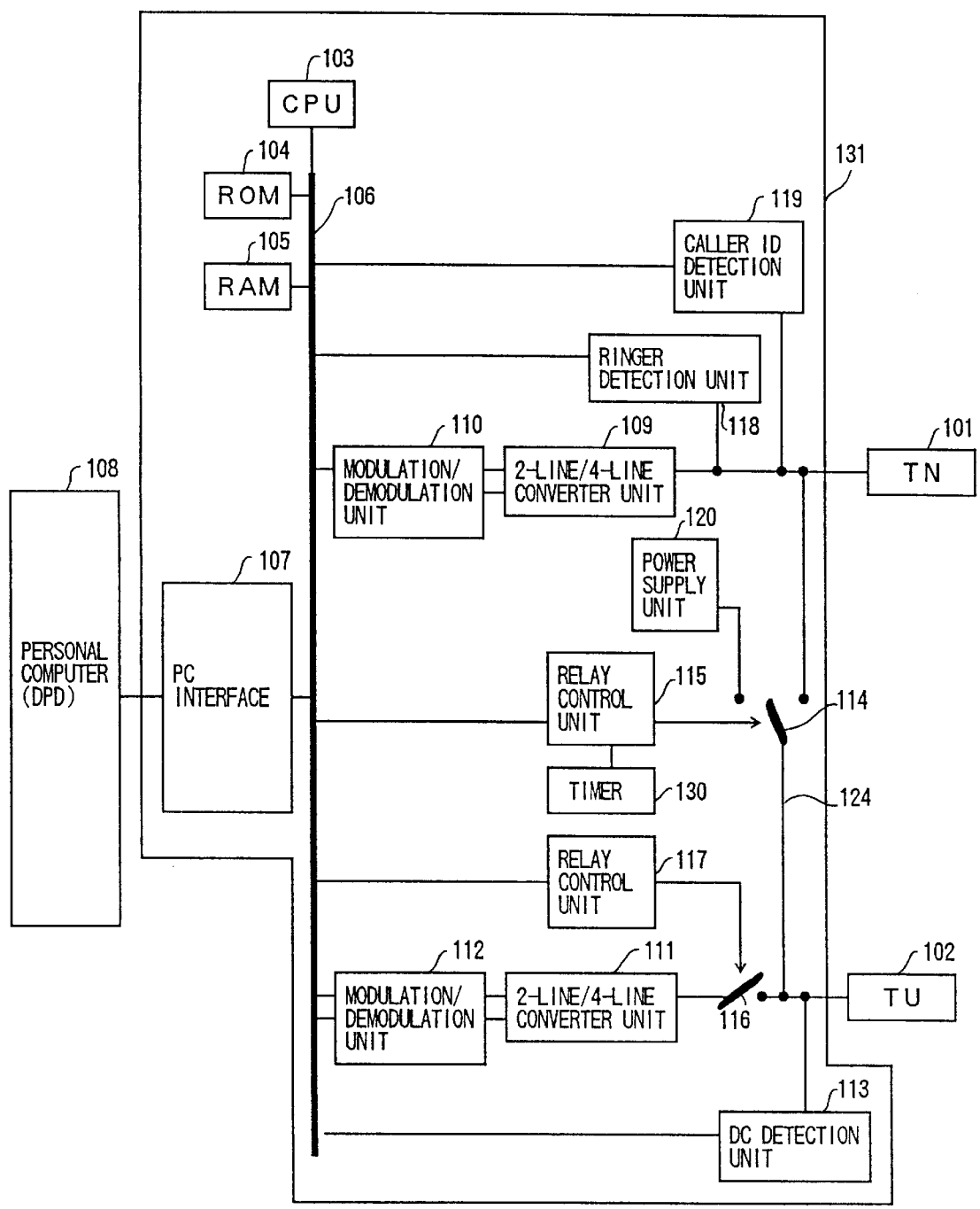
FIG. 19 is a block diagram illustrating a configuration of a third embodiment of the communication support system according to the present invention.

FIG. 19 shows a configuration of a third embodiment of the communication support system according to the present invention. The communication support system of FIG. 19 utilizes the embodiment of FIG. 18. In the present embodiment, the communication support system is capable of controlling a ringing sound on/off of the telephone unit in response to a call from the telephone network.

In FIG. 19, the elements which are the same as corresponding elements in FIG. 9 are designated by the same reference numerals, and a description thereof will be omitted.

As shown in FIG. 19, the communication support system of the present embodiment includes a power supply unit 120 provided in the modem 131, in addition to the elements of the embodiment of FIG. 9. The power supply unit 120 provides a function to supply power to the TU 102 when the transmission path 124 of the modem 131 is cut off by the relay 114 and supplying of power from the TN 101 to the TU 102 is inhibited. The power supply unit 120 corresponds to the power supply unit 16 in the embodiment of FIG. 18. The DC detection unit 113 provides a function to detect an off-hook state of the TU 102. The DC detection unit 113 corresponds to the off-hook detection unit 17 in the embodiment of FIG. 18. The ringer detection unit 118 provides a function to detect a ringer signal from the TN 101. The caller ID detection unit 119 provides a function to detect a caller identification signal from the TN 101. Other elements of the modem 131 provide functions which are the same as the functions of the corresponding elements of the embodiment of FIG. 9.

In the communication support system of the present embodiment, the personal computer 108 (or the DPD 108) has the configuration shown in FIG. 7. The DPD 108 of FIG. 19 has the elements which are the same as corresponding elements of the DPD 108 of FIG. 7, and a description thereof will be omitted.

Figure 20:
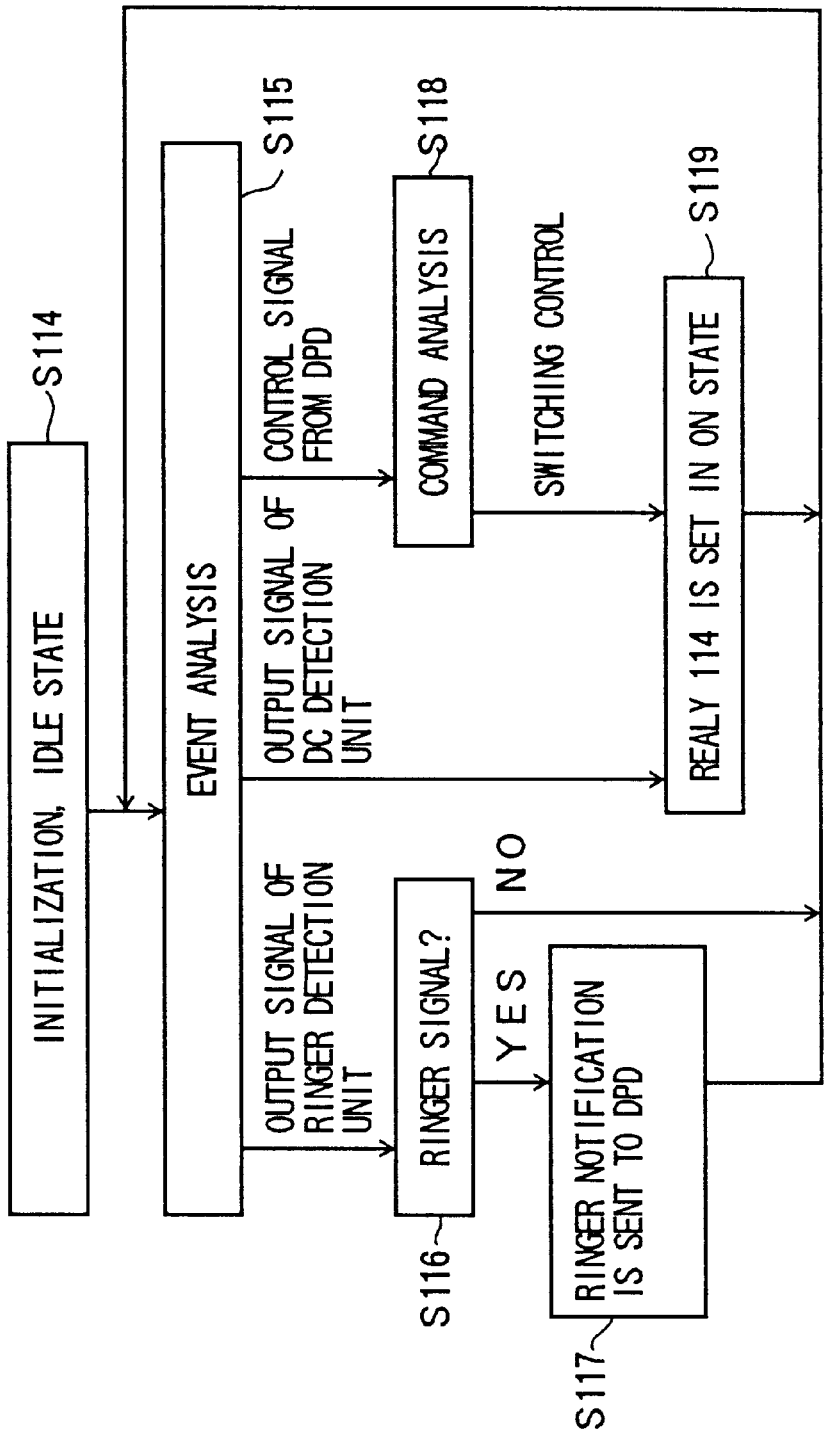
FIG. 20 is a flowchart for explaining a ringing sound control processing routine executed by a communication control device in the communication support system of FIG. 19.

Similar to the embodiment of FIG. 9, in the communication support system of the present embodiment, a ringing sound control processing routine of FIG. 20 and the determination processing routine of one of FIGS. 4, 11, and 17 are executed by the modem 131 and the DPD 108 in parallel. In the present embodiment, it is possible to control the ringing sound on/off of the TU 102 in response to the ringer signal from the TN 101. Further, it is possible for the communication support system of FIG. 19 to supply power to the TU 102 by using the power supply unit 120 when the relay 114 is set in the OFF state by the relay control unit 115 to cut off the transmission path 124 and inhibit the supplying of power from the TN 101 to the TU 102.

FIG. 20 shows a ringing sound control processing routine executed by the communication control device (or the modem 131) in the communication support system of FIG. 19. The ringing sound control processing routine of FIG. 20 may be provided in the modem 131 by using the CD-ROM 500.

In the communication support system of FIG. 19, the power supply unit 120 generates a DC voltage similar to the DC voltage supplied from the TN 101 to the TU 102, and supplies the DC voltage to the TU 102. In a case in which the TN 101 is a public switched telephone network (PSTN), the DC voltage supplied from the TN 101 to the TU 102 is normally set at −48 V. In a case in which the TN 101 is a private branch exchange (PBX), the DC voltage supplied from the TN 101 to the TU 102 is normally set at −24 V.

As shown in FIG. 20, at the start of the ringing sound control processing, the program code instructions cause the CPU 103 to be initialized and placed in an idle state (S114). The various registers and variables of the modem 131 are initialized, and the relay 114 is initially set in the OFF state. During the idle state, the CPU 103 waits for an event. The event includes the detection of a ringer signal by the ringer detection unit 118, the detection of an off-hook state of the TU 102 by the DC detection unit 113, and the reception of a control signal sent by the DPD 108.

With the modem 131 in such a condition, when an event has occurred, the program code instructions cause the CPU 103 to analyze the event (S115). When a call from the TN 101 is incoming, the ringer detection unit 118 detects the ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S116).

When the result at the step S116 is negative, the program code instructions cause the CPU 103 to go back to the step S115. When the result at the step S116 is affirmative, the program code instructions cause the CPU 103 to send a notification of the detection of the ringer signal to the DPD 108 through the PC interface 107 (S117). After the step S117 is performed, the CPU 103 goes back to the step S115.

When the reception of a control signal sent by the DPD 108 has occurred in the step S115, the program code instructions cause the CPU 103 to analyze the control signal (S118). When it is detected as the result of the step S118 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 of the modem 131 to the TN 101 (S119). When the control signal does not indicate the determination, the program code instructions cause the CPU 103 to perform a corresponding procedure for the control signal. After the step S119 is performed, the CPU 103 goes back to the step S115.

On the other hand, when the detection of an off-hook state of the TU 102 by the DC detection unit 113 has occurred in the step S115, the program code instructions cause the CPU 103 to forcefully control the relay control unit 115 so that the relay control unit 115 sets the relay 114 in the ON state to connect the TU 102 through the transmission path 124 of the modem 131 to the TN 101 (S119). At this time, the CPU 103 does not refer to the control signal sent to the modem 131 by the DPD 108.

In the embodiment of FIG. 19, even when the relay 114 is set in the OFF state to cut off the transmission path 124 between the TN 101 and the TU 102, the power supply unit 120 supplies power to the TU 102. Hence, when the telephone user lifts a handset of the TU 102, the DC detection unit 113 outputs a detection signal to the CPU 103 by monitoring a change (from the ON state to the OFF state) of the direct current flowing through a DC loop of the TU 102 and the TN 101. By sending the detection signal to the CPU 103, the DC detection unit 113 notifies the CPU 103 that the TU 102 is set in the off-hook state.

When the relay 114 is set in the ON state, the TU 102 is connected through the transmission path 124 to the TN 101. In this condition, it is possible for the telephone user on the TU 102 to send a call to the TN 101 through the modem 131.

In the communication support system of FIG. 19, when the relay 114 is set in the ON state, the power supply unit 120 is disconnected from the TU 102, and the power from the TN 101 is supplied through the transmission path to the TU 102.

Accordingly, in the communication support system of FIG. 19, it is possible to control the ringing sound on/off of the TU 102 in response to the ringer signal from the TN 101. It is possible for the communication support system of FIG. 19 to supply power to the TU 102 by using the power supply unit 120 even when the relay 114 is set in the OFF state by the switching control unit 115 to cut off the transmission path 124 and inhibit the supplying of power from the TN 101 to the TU 102. Further, it is possible for the communication support system of FIG. 19 to detect an off-hook state of the TU 102 even when the relay 114 is set in the OFF state and the transmission path 124 is cut off.

Figure 21:
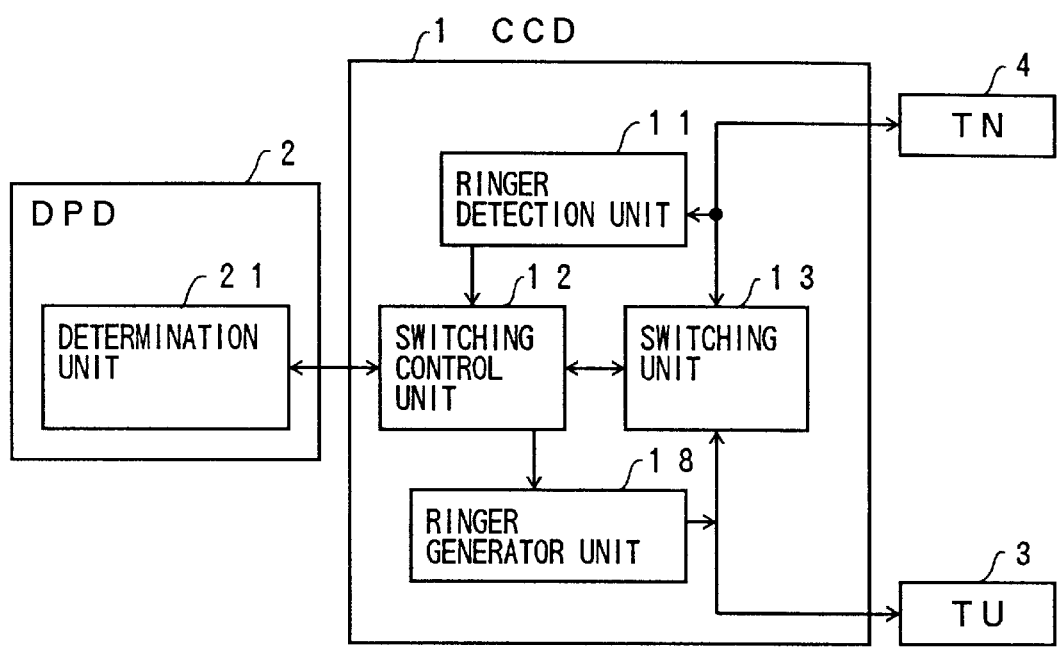
FIG. 21 is a block diagram of another embodiment incorporating the principles of the present invention.

Next, FIG. 21 shows another embodiment of the communication support system incorporating the principles of the present invention.

As shown in FIG. 21, the communication support system includes a ringer generator unit 18, in addition to the elements of the embodiment of FIG. 1. In FIG. 21, the elements which are the same as corresponding elements in FIG. 1 are designated by the same reference numerals, and a description thereof will be omitted.

In the embodiment of FIG. 21, the ringer generator unit 18 generates a ringer signal supplied to the TU 3 to output a ringing sound.

Similar to the embodiment of FIG. 1, in the communication support system of FIG. 18, the switching unit 13 connects the TU 3 through the transmission path of the CCD 1 to the TN 4 when the switching unit 13 is set in the ON state, and disconnects the TU 3 from the TN 4 by cutting off the transmission path when the switching unit 13 is set in the OFF state. The ringer detection unit 11 detects a ringer signal from the TN 4.

The DPD 2 includes the determination unit 21 which is connected to the switching control unit 12 of the CCD 1. The determination unit 21 determines, in response to the detection of the ringer signal by the ringer detection unit 11, whether the switching unit 13 is to be set in one of the ON state and the OFF state in accordance with the first switching control data table stored in the DPD 2.

In the CCD 1, the switching control unit 12 controls setting of the switching unit 13 in one of the ON state and the OFF state in response to the control signal, indicative of the determination, sent by the determination unit 21 of the DPD 2. When the determination unit 21 makes the determination that the switching unit 13 is to be set in the ON state, in accordance with the first switching control data table, the determination unit 21 sends the control signal indicative of the determination to the CCD 1. The switching control unit 12 sets the switching unit 13 in the ON state in response to the control signal from the DPD 2, and the TU 3 is connected through the transmission path to the TN 4. The TU 3 outputs a ringing sound in accordance with the ringer signal sent by the TN 4.

Further, in the DPD 2, the determination unit 21 determines, in response to the detection of the ringer signal by the ringer detection unit 11, whether the ringer generator unit 18 is to generate the ringer signal in accordance with third switching control data stored in the DPD 2. See FIG. 26 for the third switching control data, which will be described later.

In the CCD 1, the ringer generator unit 18 generates the ringer signal and supplies the ringer signal to the TU 3 in response to a ringer control signal indicative of the determination, sent by the determination unit 21.

Further, in the DPD 2, the determination unit 21 performs a ringing sound control processing in which one of a plurality of pre-determined ringer patterns is specified in accordance with the third switching control data, so that the TU 3 is allowed to ring out by the specified ringer pattern. See FIG. 24 for the plurality of pre-determined ringer patterns, which will be described later.

Accordingly, in the communication support system of FIG. 21, it is possible to control the ringing sound on/off of the TU 3 in response to a call from the TN 4. Further, it is possible for the communication support system of FIG. 21 to carry out a ringing sound control processing in which the TU 3 rings out by a specified one among a plurality of special ringer patterns in response to a call from the TN 4.

Figure 22:
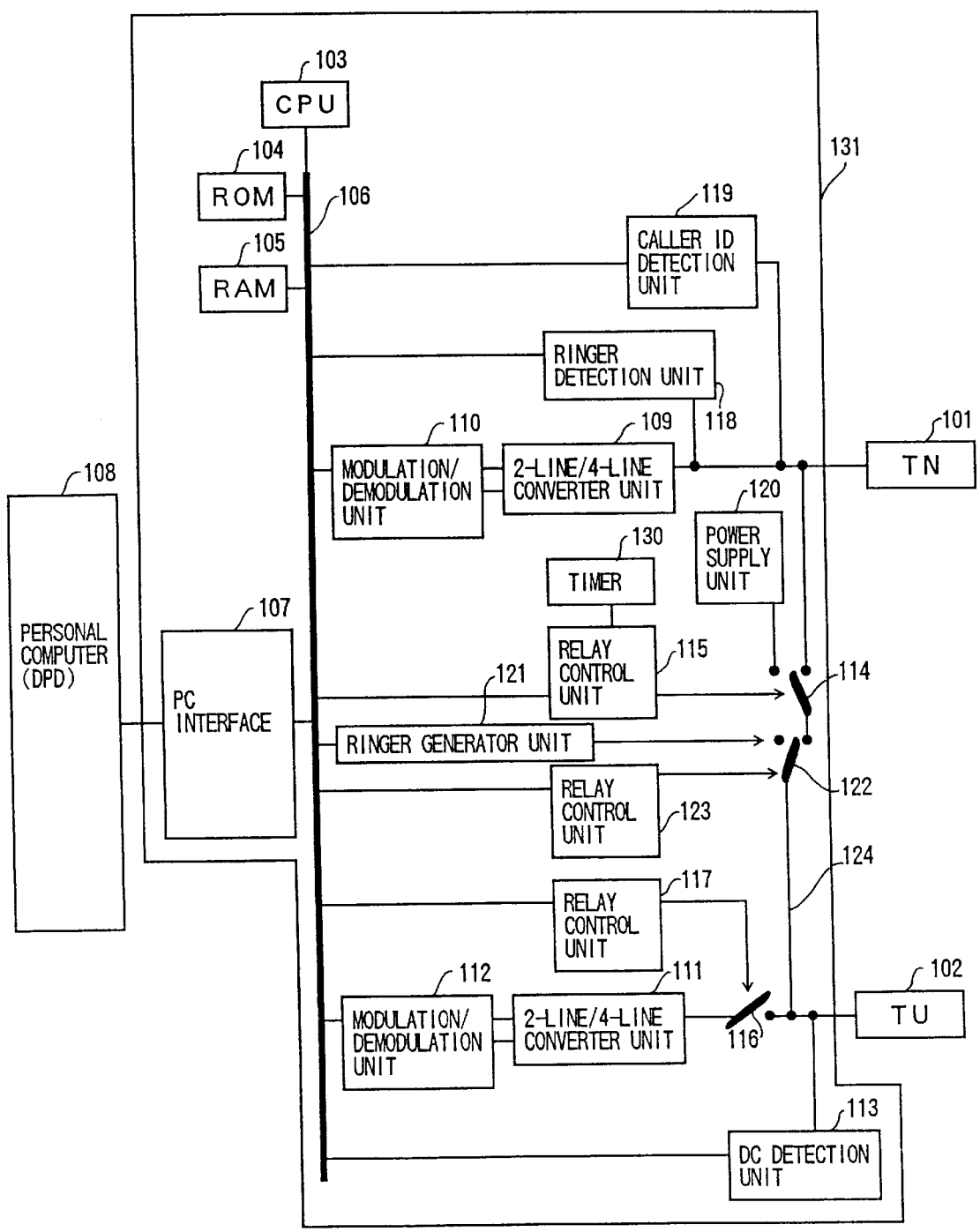
FIG. 22 is a block diagram illustrating a configuration of a fourth embodiment of the communication support system according to the present invention.

FIG. 22 shows a configuration of a fourth embodiment of the communication support system according to the present invention. The communication support system of FIG. 22 utilizes the embodiment of FIG. 21. In the present embodiment, the communication support system is capable of controlling a ringing sound on/off of the telephone unit in response to a call from the telephone network, and capable of carrying out a ringing sound control processing in which the telephone unit rings out by a specified one among a plurality of special ringer patterns in response to a call from the telephone network.

In FIG. 22, the elements which are the same as corresponding elements in FIG. 19 are designated by the same reference numerals, and a description thereof will be omitted.

As shown in FIG. 22, the communication support system of the present embodiment includes a ringer generator unit 121, a relay 122 and a relay control unit 123 provided in the modem 131, in addition to the elements of the embodiment of FIG. 19. The ringer generator unit 121 provides a function to generate a ringer signal supplied to the TU 102 to output a ringing sound in accordance with the contents of the ringer signal. The ringer generator unit 121 corresponds to the ringer generator unit 18 in the embodiment of FIG. 21. The relay 122 is a switching device similar to the relay 114. The relay 122 provides a function to connect the ringer generator unit 121 to the TU 102 when the relay 122 is set in an ON state, and provides a function to disconnect the ringer generator unit 121 from the TU 102 when the relay 122 is set in an OFF state. The relay control unit 123 provides a function to control setting of the relay 122 in one of the ON state and the OFF state under the control of the CPU 103.

In the embodiment of FIG. 22, the power supply unit 120 provides a function to supply power to the TU 102 when the transmission path 124 of the modem 131 is cut off by the relay 114 and supplying of power from the TN 101 to the TU 102 is inhibited. The DC detection unit 113 provides a function to detect an off-hook state of the TU 102. The ringer detection unit 118 provides a function to detect a ringer signal from the TN 101. The caller ID detection unit 119 provides a function to detect a caller identification signal from the TN 101. Other elements of the modem 131 provide functions which are the same as the functions of the corresponding elements of the embodiment of FIG. 19.

In the communication support system of the present embodiment, the personal computer 108 (or the DPD 108) has the configuration shown in FIG. 7. The DPD 108 of FIG. 22 has the elements which are the same as corresponding elements of the DPD 108 of FIG. 7, and a description thereof will be omitted.

Figure 23:
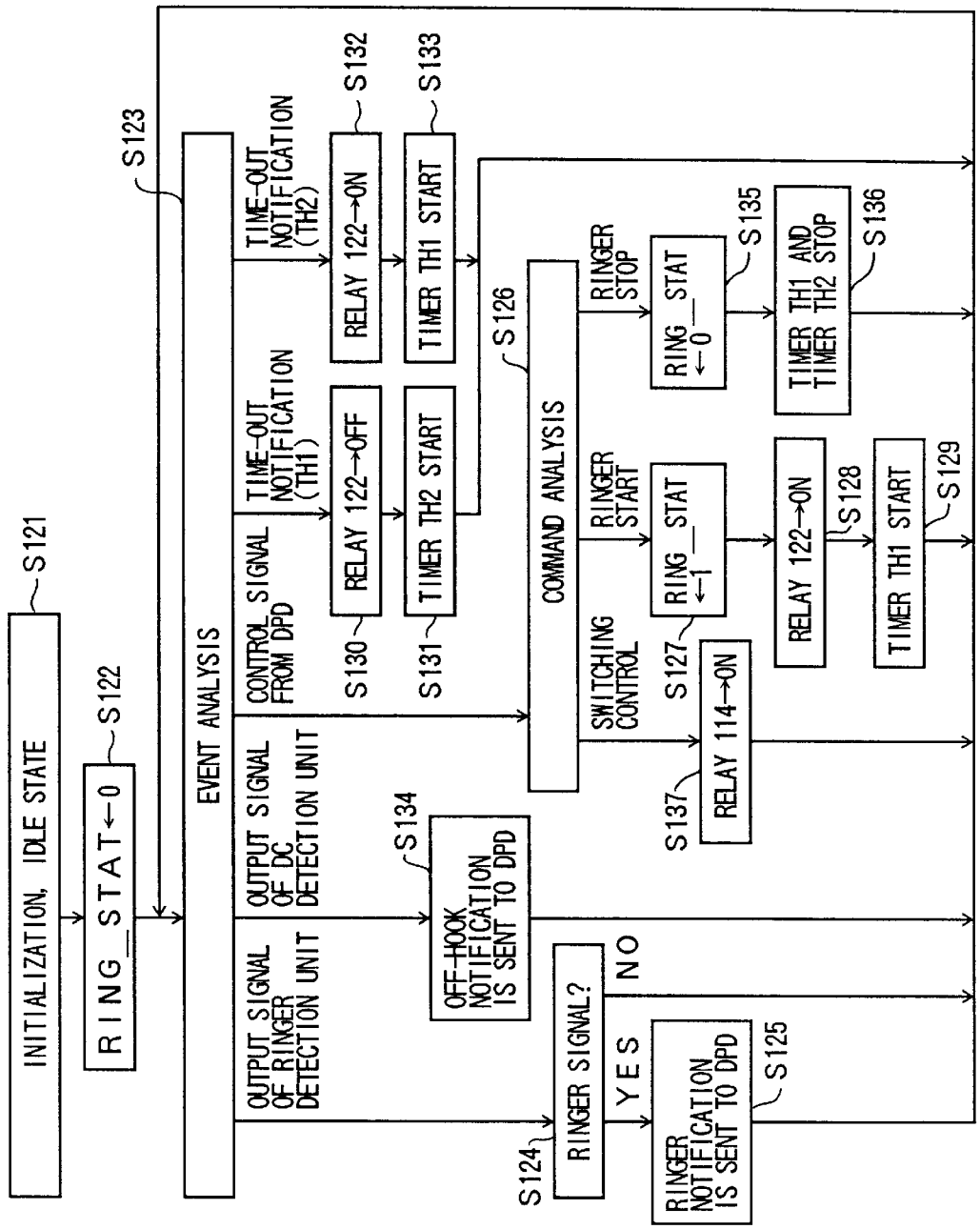
FIG. 23 is a flowchart for explaining a ringing sound control processing routine executed by a communication control device in the communication support system of FIG. 22.
Figure 25:
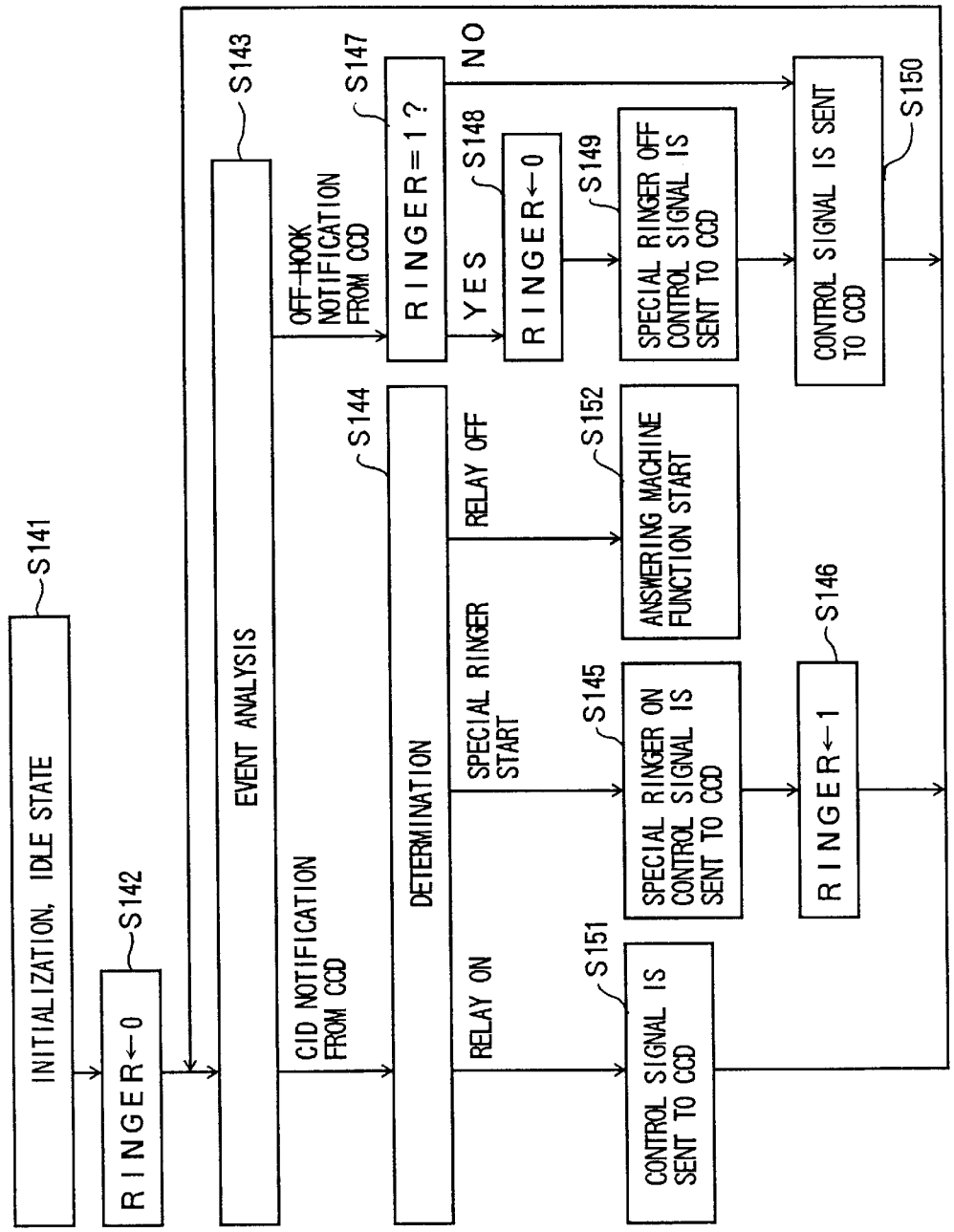
FIG. 25 is a flowchart for explaining a determination processing routine executed by a data processing device in the communication support system of FIG. 22.

Similar to the embodiment of FIG. 19, in the communication support system of the present embodiment, a ringing sound control processing routine of FIG. 23 and a determination processing routine of FIG. 25 are executed by the modem 131 and the DPD 108 in parallel. In the present embodiment, it is possible to control the ringing sound on/off of the TU 102 in response to the ringer signal from the TN 101. Further, it is possible for the communication support system of FIG. 22 to supply power to the TU 102 by using the power supply unit 120 when the relay 114 is set in the OFF state by the relay control unit 115 to cut off the transmission path 124 and inhibit the supplying of power from the TN 101 to the TU 102. Further, it is possible for the communication support system of FIG. 22 to allow the TU 102 to ring out by a specified one among a plurality of special ringer patterns in response to a call from the TN 101.

FIG. 23 shows a ringing sound control processing routine executed by the communication control device (or the modem 131) in the communication support system of FIG. 22. The ringing sound control processing routine of FIG. 23 may be provided in the modem 131 by using the CD-ROM 500.

As shown in FIG. 23, at the start of the ringing sound control processing, the program code instructions cause the CPU 103 to be initialized and placed in an idle state (S121). The various registers and variables of the modem 131 are initialized, and the relay 114 is initially set in the OFF state. During the idle state, the CPU 103 waits for an event. The event includes the detection of a ringer signal by the ringer detection unit 118, the detection of an off-hook state of the TU 102 by the DC detection unit 113, the reception of a control signal sent by the DPD 108, and the reception of a time-out notification sent by the timer 130.

In the present embodiment, the timer 130 includes a first timer (TH1) and a second timer (TH2). The first timer TH1 starts counting in response to an ON state of the relay 122 set by the relay control unit 123, and sends a time-out notification to the CPU 103 immediately after the first timer TH1 exceeds a predetermined first time. The second timer TH2 starts counting in response to an OFF state of the relay 122 set by the relay control unit 123, and sends a time-out notification to the CPU 103 immediately after the second timer TH2 exceeds a predetermined second time.

After the step S121 is performed, the program code instructions cause the CPU 103 to set a state variable RING_STAT at zero (S122). When the state variable RING_STAT is set at one, it indicates that a ringer signal is being generated by the ringer generator unit 121 in the modem 131. When the state variable RING_STAT is set at zero, it indicates that no ringer signal is generated by the ringer generator unit 121 in the modem 131.

With the modem 131 in such a condition, when an event has occurred, the program code instructions cause the CPU 103 to analyze the event (S123). When a call from the TN 101 is incoming, the ringer detection unit 118 detects the ringer signal from the TN 101 and notifies the CPU 103 of the detection of the ringer signal. The program code instructions cause the CPU 103 to determine whether the received signal from the TN 101 is the ringer signal sent to call the TU 102, by detecting the characteristics of the waveform of the received signal by using the ringer detection unit 118 (S124).

When the result at the step S124 is negative, the program code instructions cause the CPU 103 to go back to the step S123. When the result at the step S124 is affirmative, the program code instructions cause the CPU 103 to send a notification of the detection of the ringer signal to the DPD 108 through the PC interface 107 (S125). After the step S125 is performed, the CPU 103 goes back to the step S123.

When the reception of a control signal sent by the DPD 108 has occurred in the step S123, the program code instructions cause the CPU 103 to analyze the control signal (S126). When it is detected as the result of the step S126 that the control signal indicates the determination to set the relay 114 in the ON state, the program code instructions cause the CPU 103 to control the relay control unit 115 so that the relay control unit 115 sets the relay 114 in the ON state to connect the TU 102 through the transmission path 124 to the TN 101 (S137). The TU 102 is connected through the transmission path 124 to the TN 101, and the TU 102 outputs a ringing sound in accordance with the ringer signal sent by the TN 101. After the step S137 is performed, the CPU 103 goes back to the step S123.

When it is detected as the result of the step S126 that the control signal indicates a ringer start command to the ringer generator unit 121, the program code instructions cause the CPU 103 to set the state variable RING_STAT at one (S127). At this time, the CPU 103 detects a ringer pattern number included in the control signal from the DPD 108. The CPU 103 makes reference to the plurality of special ringer patterns stored in the ROM 104 or the RAM 105, and reads a corresponding ringer pattern (which is, in the present embodiment, ringer ON time and ringer OFF time) from the plurality of special ringer patterns in accordance with the detected ringer pattern number.

FIG. 24 shows an example of the plurality of special ringer patterns used to generate a ringer signal. In the example of FIG. 24, a correlation between ringer pattern number (N), ringer ON time (TH1) and ringer OFF time (TH2) is defined for each of the plurality of special ringer patterns. As described above, the plurality of special ringer patterns are stored in the ROM 104 or the RAM 105 in the modem 131. For example, in a case of the special ringer pattern with the ringer pattern number #1, the ringer ON time TH1 is 1 sec. and the ringer OFF time TH2 is 2 sec. Hereinafter, it is supposed that the control signal sent by the DPD 108 includes the ringer pattern number #1 and the CPU 103 at the step S127 receives this control signal from the DPD 108, for the sake of convenience of description.

After the step S127 is performed, the program code instructions cause the CPU 103 to set the relay 122 in the ON state by controlling the relay control unit 123 (S128). The ringer generator unit 121 is connected to the TU 102 through the relay 122. At the same time, the ringer generator unit 121 starts supplying a ringer signal to the TU 102. After the step S128 is performed, the program code instructions cause the CPU 103 to start counting of the first timer TH1 (S129). As described above, the first timer TH1 sends a time-out notification to the CPU 103 immediately after the first timer TH1 exceeds 1 second (or the ringer ON time TH1). After the step S129 is performed, the CPU 103 goes back to the step S123.

When the reception of a time-out notification sent by the first timer TH1 has occurred in the step S123 after the time period of 1 second, the program code instructions cause the CPU 103 to set the relay 122 in the OFF state by controlling the relay control unit 123 (S130). After the step S130 is performed, the program code instructions cause the CPU 103 to start counting of the second timer TH2 (S131). As described above, the second timer TH2 sends a time-out notification to the CPU 103 immediately after the second timer TH2 exceeds 2 seconds (or the ringer OFF time TH2). After the step S131 is performed, the CPU 103 goes back to the step S123.

When the reception of a time-out notification sent by the second timer TH2 has occurred in the step S123 after the time period of 2 seconds, the program code instructions cause the CPU 103 to set the relay 122 in the ON state by controlling the relay control unit 123 (S132). After the step S132 is performed, the program code instructions cause the CPU 103 to start counting of the first timer TH1 (S133). After the step S133 is performed, the CPU 103 goes back to the step S123. The CPU 103 repeats the step S123 and the steps S130 through S133 in this manner. In the modem 131 of the present embodiment, it is possible that the ringer generator unit 121 supplies, to the TU 102, the ringer signal having a waveform of 16 Hz, 75 V rms and periodically turns ON for 1 second and turns off for 2 seconds, which is the same as the ringer signal normally sent by the TN 101 to call the TU 102. The ringer ON time of the first timer TH1 and the ringer OFF time of the second timer TH2 may be set at another time period.

In the present embodiment, when the relay 122 is set in the ON state, the ringer generator unit 121 is connected to the TU 102 through the relay 122. The TU 102 outputs a ringing sound in accordance with the ringer signal from the ringer generator unit 121 only when the relay 122 is set in the ON state.

When the detection of an off-hook state of the TU 102 by the DC detection unit 113 has occurred in the step S123, the program code instructions cause the CPU 103 to send an off-hook notification to the DPD 108 through the PC interface 107 (S134). After the step S134 is performed, the CPU 103 goes back to the step S123.

When the reception of a control signal sent by the DPD 108 has again occurred in the step S123, the program code instructions cause the CPU 103 to analyze the control signal (S126). When it is detected as the result of the step S126 that the control signal indicates a ringer stop command to the ringer generator unit 121, the program code instructions cause the CPU 103 to set the state variable RING_STAT at zero (S135). The relay 122 is set in the OFF state. After the step S135 is performed, the program code instructions cause the CPU 103 to stop counting of both the first timer TH1 and the second timer TH2 (S136). At the same time, the ringer generator unit 121 stops operation, and the CPU 103 sets the relay 114 in the ON state by controlling the relay control unit 115.

When the relay 114 is set in the ON state, the TU 102 is connected through the transmission path 124 to the TN 101. With the communication support system in this condition, the telephone conversation between the TU 102 and the TN 101 starts.

FIG. 25 shows a determination processing routine executed by the data processing device (the DPD 108) in the communication support system of FIG. 22. The determination processing routine of FIG. 25 may be provided in the DPD 108 of FIG. 22 by using the CD-ROM 400.

As shown in FIG. 25, at the start of the determination processing, the program code instructions cause the control unit 301 to be initialized and placed in an idle state (S141). The registers and variables of the DPD 108 are initialized. During the idle state, the control unit 301 waits for an event. The event includes the reception of a ringer notification from the modem 131, the reception of a CID notification from the modem 131, and the reception of an off-hook notification from the modem 131.

After the step S141 is performed, the program code instructions cause the control unit 301 to set a state variable "RINGER" at zero (S142). When the state variable RINGER is set at one, it indicates that a ringer signal is being generated by the ringer generator unit 121 in the modem 131. When the state variable RINGER is set at zero, it indicates that no ringer signal is generated by the ringer generator unit 121 in the modem 131.

With the DPD 108 in such a condition, when an event has occurred, the program code instructions cause the control unit 301 to analyze the event (S143). When a CID notification from the modem 131 is received at the step S143, the program code instructions cause the control unit 301 to determine whether the relay 114 of the modem 131 is to be set in one of the ON state and the OFF state in accordance with the third switching control data table (FIG. 26) stored in the DPD 108 (S144). For a certain CID notification, the control unit 301 in the step S144 determines whether the ringer generator unit 121 of the modem 131 is to generate a ringer signal by a specified one among a plurality of special ringer patterns in accordance with the third switching control data table which will be described below.

FIG. 26 shows an example of the third switching control data table stored in the memory unit 302 of the DPD 108 of FIG. 22. As shown in FIG. 26, in the third switching control data table, a correlation between a caller ID (the phone number), a caller profile (the caller name), and determination of one of switching on/off control for the relay 114 and special ringer pattern number for the ringer generator unit 121 is defined for each of a plurality of predetermined caller IDs.

The caller ID (the phone number) is given to the control unit 301 by a portion of the CID notification from the modem 131. In the example of FIG. 26, when the caller ID given to the control unit 301 at the step S43 matches with "044-AAA-BBBB" in the third switching control data table, the determination is made by the control unit 301 to set the relay 114 in the ON state. When the caller ID matches with "078-CCC-DDDD" in the third switching control data table, the determination is made by the control unit 301 to set the relay 114 in the OFF state. When the caller ID matches with "0423-EE-FFFF" in the third switching control data table, the determination is made by the control unit 301 to set the ringer generator unit 121 to generate a ringer signal by the special ringer pattern #2. Hence, it is possible for the communication support system of the present embodiment to set the ringing sound pattern of the TU 102 by a specified one among the plurality of special ringer patterns when a call is sent from the TN 101 by a specific caller.

In the step S144, when the caller ID of the CID notification matches with, for example, "044-AAA-BBBB", the determination is made by the control unit 301 to set the relay 114 in the ON state in accordance with the third switching control data table of FIG. 26. In this case, the program code instructions cause the control unit 301 to send a control signal indicative of the determination to the modem 131 through the PC interface 107 (S151).

When the caller ID of the CID notification matches with, for example, "078-CCC-DDDD", the determination at the step S144 is made by the control unit 301 to set the relay 114 in the OFF state in accordance with the third switching control data table of FIG. 26. In this case, the program code instructions cause the control unit 301 to send a control signal indicative of the determination to the modem 131 through the PC interface 107 and starts performing an answering machine function (S152). In the modem 131, the relay 114 is set in the OFF state, and the TU 102 is disconnected from the TN 101 by cutting off the transmission path 124. In the step S152, the DPD 108 transmits a pre-recorded answering message to the TN 101 through the PC interface 107 by the performance of the answering machine function.

When the caller ID of the CID notification matches with, for example, "0423-EE-FFFF", the determination at the step S144 is made by the control unit 301 to start the special ringer procedure by the special ringer pattern #2 in accordance with the third switching control data table of FIG. 26. In this case, the program code instructions cause the control unit 301 to send a control signal indicative of the determination to the modem 131 through the PC interface 107 (S145). Further, the program code instructions cause the control unit 301 to set the state variable RINGER at one (S146). In the modem 131 in this case, the ringer generator unit 121 generates the ringer signal by the special ringer pattern #2 and supplies it to the TU 102. The TU 102 outputs a ringing sound by the special ringer pattern #2 from the DPD 108.

After one of the steps S151, S146 and S152 is performed, the control unit 301 goes back to the step S143.

When an off-hook notification from the modem 131 is received at the step S143, the program code instructions cause the control unit 301 to determine whether the state variable RINGER is equal to one (S147). When the result at the step S147 is affirmative, the program code instructions cause the control unit 301 to set the state variable RINGER at zero (S148). Further, the program code instructions cause the control unit 301 to send a control signal indicative of the stop of the special ringer procedure to the modem 131 through the PC interface 107 (S149). Further, the program code instructions cause the control unit 301 to send a control signal indicative of the switching control (the setting of the relay 114 in the ON state) to the modem 131 through the PC interface 107 (S150). After the step S150 is performed, the control unit 301 goes back to the step S143.

When the result at the step S147 is negative, the program code instructions cause the control unit 301 to perform the step S150. After the step S150 is performed, the control unit 301 goes back to the step S143.

In the communication support system of the present embodiment, when the relay 114 is set in the ON state, the TU 102 is connected through the transmission path 124 to the TN 101. With the communication support system in this condition, the telephone conversation between the TU 102 and the TN 101 starts.

Accordingly, it is possible for the communication support system of the present embodiment to effectively control the ringing sound on/off of the telephone unit in response to the call from the telephone network. In the communication support system of FIG. 22, the ringing sound control processing routine of FIG. 23 and the determination processing routine of FIG. 25 are carried out by the communication control device and the data processing device in parallel. It is possible for the communication support system of the present embodiment to effectively control the telephone unit so as to ring out by a specified one of a plurality of special ringer patterns in response to the call from the telephone network.

Further, the present invention is not limited to the above-described embodiments, and variations and modifications may be made without departing from the scope of the present invention.

The present invention is based on Japanese priority application No. 9-319652, filed on Nov. 20, 1997, the entire contents of which are hereby incorporated by reference.

What is claimed is:

1. A communication support system adapted to connect a telephone unit through a transmission path of a communication control device to a telephone network and adapted to connect a data processing device through the communication control device to the telephone network, comprising:

a switching unit connecting the telephone unit through the transmission path to the telephone network when the switching unit is set in a first state, and disconnecting the telephone unit from the telephone network by cutting off the transmission path when the switching unit is set in a second state;

a ringer detection unit detecting a ringer signal from the telephone network;

a determination unit determining, in response to the detection of the ringer signal by the ringer detection unit, whether the switching unit is to be set in one of the first state and the second state in accordance with first switching control data stored in the data processing device;

a switching control unit controlling setting of the switching unit in one of the first state and the second state in response to a received control signal, indicative of the determination, sent by the determination unit; and a timer starting counting from a time of the detection of the ringer signal by the ringer detection unit, and outputting a time-out notification after the timer count from the time of the detection exceeds a predetermined time, wherein, when the switching control unit does not receive the control signal from the determination unit of the data processing device before the timer exceeds a predetermined time and outputs a time-out notification, the switching control unit controls the switching unit so that the switching unit is set in the first state to connect the telephone unit through the transmission path to the telephone network.

2. The communication support system according to claim 1, further comprising a caller ID detection unit detecting a caller identification signal from the telephone network, wherein the determination unit determines, in response to the detection of the caller identification signal by the caller ID detection unit, whether the switching unit is to be set in one of the first state and the second state in accordance with second switching control data stored in the data processing device.

3. The communication support system according to claim 2, wherein the timer is configured to start counting from a time of the detection of the caller identification signal by the caller ID detection unit, and to output a time-out notification after the timer count from the time of the detection exceeds a predetermined time, wherein, when the switching control unit does not receive the control signal from the determination unit of the data processing device before the time-out notification is output by the timer, the switching control unit controls the switching unit so that the switching unit is set in the first state to connect the telephone unit through the transmission path to the telephone network.

4. The communication support system according to claim 2, wherein, when the ringer detection unit detects the ringer signal from the telephone network and the caller ID detection unit determines that the ringer signal is sent to call the telephone unit without detecting a caller identification signal from the telephone network, the switching control unit controls the switching unit regardless of the control signal sent by the determination unit, so that the switching unit is set in the first state to connect the telephone unit through the transmission path to the telephone network.

5. The communication support system according to claim 3, wherein, when the ringer detection unit detects an activation signal from the telephone network and determines that the activation signal is sent prior to the ringer signal to notify the telephone unit of incoming of the caller identification signal, the switching control unit controls the switching unit regardless of the control signal sent by the determination unit, so that the switching unit is set in the first state and the activation signal is sent to the telephone unit to ring the telephone unit.

6. The communication support system according to claim 1, further comprising a timer starting counting when a power switch of the communication control device is turned ON, and outputting a time-out notification after the timer exceeds a predetermined time,
wherein, when the control signal is not sent by the determination unit before the time-out notification is output by the timer, the switching control unit controls the switching unit so that the switching unit is set in the first state to connect the telephone unit through the transmission path to the telephone network.

7. The communication support system according to claim 1, further comprising a power supply unit supplying power to the telephone unit when the switching unit is set in the second state by the switching control unit to cut off the transmission path and inhibit supplying of power from the telephone network to the telephone unit.

8. The communication support system according to claim 1, further comprising:
a ringer generator unit generating a ringer signal supplied to the telephone unit to output a ringing sound; and
a ringer determination unit determining, in response to the detection of the ringer signal by the ringer detection unit, whether the ringer generator unit is to generate the ringer signal in accordance with third switching control data stored in the data processing device,
wherein the ringer generator unit generates the ringer signal and supplies the ringer signal to the telephone unit in response to a ringer control signal, indicative of the determination, sent by the ringer determination unit.

9. The communication support system according to claim 8, wherein the ringer determination unit performs a ringing sound control processing in which one of a plurality of predetermined ringer patterns is specified in accordance with the third switching control data, so that the telephone unit is allowed to ring out by the specified ringer pattern.

10. A communication control device adapted to connect a telephone unit through a transmission path to a telephone network and adapted to connect a data processing device through the communication control device to the telephone network, comprising:
a switching unit connecting the telephone unit through the transmission path to the telephone network when the switching unit is set in a first state, and disconnecting the telephone unit from the telephone network by cutting off the transmission path when the switching unit is set in a second state;
a ringer detection unit detecting a ringer signal from the telephone network;
a switching control unit controlling setting of the switching unit in one of the first state and the second state in response to a received control signal sent by the data processing device when the ringer signal is detected by the ringer detection unit; and
a timer starting counting from a time of the detection of the ringer signal by the ringer detection unit, and outputting a time-out notification after the timer count from the time of the detection exceeds a predetermined time, wherein, when the switching control unit does not receive the control signal from the data processing device before the timer exceeds a predetermined time and outputs a time-out notification, the switching control unit controls the switching unit so that the switching unit is set in the first state to connect the telephone unit through the transmission path to the telephone network.

11. The communication control device according to claim 10, further comprising a caller ID detection unit detecting a caller identification signal from the telephone network,
wherein, when the caller identification signal is detected by the caller ID detection unit, the switching control unit controls the setting of the switching unit in one of the first state and the second state in response to the control signal sent by the data processing device.

12. The communication control device according to claim 11, wherein the timer is configured to start counting from a time of the detection of the caller identification signal by the caller ID detection unit, and to output a time-out notification after the timer count from the time of the detection exceeds a predetermined time,
wherein, when the switching control unit does not receive the control signal from the data processing device before the time-out notification is output by the timer, the switching control unit controls the switching unit so that the switching unit is set in the first state to connect the telephone unit through the transmission path to the telephone network.

13. The communication control device according to claim 11, wherein, when the ringer detection unit detects the ringer signal from the telephone network and the caller ID detection unit determines that the ringer signal is sent to call the telephone unit without detecting a caller identification signal from the telephone network, the switching control unit controls the switching unit regardless of the control signal sent by the data processing device, so that the switching unit is set in the first state to connect the telephone unit through the transmission path to the telephone network.

14. The communication control device according to claim 13, wherein, when the ringer detection unit detects an activation signal from the telephone network and determines that the activation signal is sent prior to the ringer signal to notify the telephone unit of incoming of the caller identification signal, the switching control unit controls the switching unit regardless of the control signal sent by the data processing device, so that the switching unit is set in the first state and the activation signal is sent to the telephone unit to ring the telephone unit.

15. The communication control device according to claim 10, further comprising a timer starting counting when a power switch of the communication control device is turned ON, and outputting a time-out notification after the timer exceeds a predetermined time,
wherein, when the control signal is not sent by the data processing device before the time-out notification is output by the timer, the switching control unit controls the switching unit so that the switching unit is set in the first state to connect the telephone unit through the transmission path to the telephone network.

16. The communication control device according to claim 10, further comprising a power supply unit supplying power to the telephone unit when the switching unit is set in the second state by the switching control unit to cut off the transmission path and inhibit supplying of power from the telephone network to the telephone unit.

17. The communication control device according to claim 10, further comprising a ringer generator unit generating a ringer signal supplied to the telephone unit to output a ringing sound, wherein the ringer generator unit generates the ringer signal by a specified one of a plurality of predetermined ringer patterns in response to a ringer control signal sent by the data processing device, and supplies the ringer signal to the telephone unit to allow the telephone unit to ring out by the specified ringer pattern.

18. A data processing device for a communication support system which is adapted to connect a telephone unit through a transmission path of a communication control device to a telephone network and adapted to connect the data processing device through the communication control device to the telephone network, the communication control device comprising:

a switching unit connecting the telephone unit through the transmission path to the telephone network when the switching unit is set in a first state, and disconnecting the telephone unit from the telephone network by cutting off the transmission path when the switching unit is set in a second state;

a ringer detection unit detecting a ringer signal from the telephone network; and a switching control unit controlling setting of the switching unit in one of the first state and the second state in response to a received control signal sent by the data processing device, the data processing device comprising a determination unit determining, in response to the detection of the ringer signal by the ringer detection unit, whether the switching unit is to be set in one of the first state and the second state in accordance with first switching control data stored in the data processing device, wherein, the communication control device further comprising a timer starting counting from a time of the detection of the ringer signal by the ringer detection unit, and outputting a time-out notification after the timer count from the time of the detection exceeds a predetermined time, wherein, when the switching control unit does not receive the control signal from the determination unit of the data processing device before the timer exceeds a predetermined time and outputs a time-out notification, the switching control unit controls the switching unit so that the switching unit is set in the first state to connect the telephone unit through the transmission path to the telephone network.

19. The data processing device according to claim 18, wherein the determination unit determines, in response to detection of a caller identification signal by the communication control device, whether the switching unit is to be set in one of the first state and the second state in accordance with second switching control data stored in the data processing device.

20. The data processing device according to claim 18, wherein, when a start notification is output by the communication control device after a power switch is turned ON, the determination unit sends a response notification to the communication control device.

21. The data processing device according to claim 18, further comprising a ringer determination unit determining, in response to the detection of the ringer signal by the ringer detection unit, whether the communication control device is to generate a ringer signal in accordance with third switching control data stored in the data processing device, wherein the ringer determination unit sends a ringer control signal indicative of the determination to the communication control device, so that the communication control device generates the ringer signal by a specified one of a plurality of predetermined ringer patterns in response to the ringer control signal and supplies the ringer signal to the telephone unit to allow the telephone unit to ring out by the specified ringer pattern.

22. A computer readable medium storing program code causing a processor to execute a ringing sound control processing on a communication control device in a communication support system which is adapted to connect a telephone unit through a transmission path of the communication control device to a telephone network and adapted to connect a data processing device through the communication control device to the telephone network, comprising:

a first program code causing the processor to detect a ringer signal from the telephone network by using a ringer detection unit;

a second program code causing the processor to control setting of a switching unit in one of a first state and a second state by using a switching control unit in response to a received control signal sent by the data processing device when the ringer signal is detected; and a third program code causing the processor to start counting from a time of the detection of the ringer signal, and output a time-out notification by using the timer after the timer count from the time of the detection exceeds a predetermined time, wherein, when the switching control unit does not receive the control signal sent by the data processing device before the timer exceeds a predetermined time and outputs a time-out notification, said second program code controls the switching unit so that the switching unit is set in the first state to connect the telephone unit through the transmission path to the telephone network.

23. The computer readable medium according to claim 22, further comprising:

a fourth program code causing the processor to detect a caller identification signal from the telephone network by using a caller ID detection unit, wherein, when the caller identification signal is detected, said second program code controls the setting of the switching unit in one of the first state and the second state in response to the control signal sent by the data processing device.

24. The computer readable medium according to claim 23, further comprising:

a fifth program code causing the processor to start counting of a timer from a time of the detection of the caller identification signal, and output a time-out notification by using the timer after the timer count from the time of detection exceeds a predetermined time, wherein, when the switching control unit does not receive the control signal sent by the data processing device before the time-out notification is output, said second program code controls the switching unit so that the switching unit is set in the first state to connect the telephone unit through the transmission path to the telephone network.

25. The computer readable medium according to claim 23, wherein, when the ringer detection unit detects the ringer signal from the telephone network and the caller ID detection unit determines that the ringer signal is sent to call the telephone unit without detecting a caller identification signal from the telephone network, said second program code controls the switching unit regardless of the control signal sent by the data processing device, so that the switching unit is set in the first state to connect the telephone unit through the transmission path to the telephone network.

26. The computer readable medium according to claim 23, wherein, when the ringer detection unit detects an activation signal from the telephone network and determines that the activation signal is sent prior to the ringer signal to notify the telephone unit of incoming of the caller identification signal, said second program code controls the switching unit regardless of the control signal sent by the data processing device, so that the switching unit is set in the first state and the activation signal is sent to the telephone unit to ring the telephone unit.

27. The computer readable medium according to claim 22, further comprising:
   a sixth program code causing the processor to start counting of a timer when a power switch of the communication control device is turned ON, and output a time-out notification by using the timer after the timer exceeds a predetermined time,
   wherein, when the control signal is not sent by the data processing device before the time-out notification is output, said second program code controls the switching unit so that the switching unit is set in the first state to connect the telephone unit through the transmission path to the telephone network.

28. The computer readable medium according to claim 22, further comprising:
   a seventh program code causing the processor to supply power to the telephone unit by using a power supply unit when the switching unit is set in the second state by said second program code to cut off the transmission path.

29. The computer readable medium according to claim 22, further comprising:
   an eighth program code causing the processor to generate a ringer signal by using a ringer generator unit, the ringer signal being supplied to the telephone unit to output a ringing sound, wherein said eighth program code generates the ringer signal by a specified one of a plurality of predetermined ringer patterns in response to a ringer control signal sent by the data processing device, and supplies the ringer signal to the telephone unit to allow the telephone unit to ring out by the specified ringer pattern.

30. A computer readable medium storing program code causing a first processor to execute a determination processing on the data processing device in the communication support system in parallel with the ringing sound control processing executed in accordance with the computer readable medium according to claim 22, comprising:
   a ninth program code causing the first processor to determine, in response to the detection of the ringer signal by the ringer detection unit, whether the switching unit is to be set in one of the first state and the second state in accordance with first switching control data stored in the data processing device.

31. The computer readable medium according to claim 30, wherein said ninth program code determines, in response to detection of a caller identification signal by the communication control device, whether the switching unit is to be set in one of the first state and the second state in accordance with second switching control data stored in the data processing device.

32. The computer readable medium according to claim 30, wherein, when a start notification is output by the communication control device after a power switch is turned ON, said ninth program code sends a response notification to the communication control device.

33. The computer readable medium according to claim 30, further comprising:
   a tenth program code causing the first processor to determine, in response to the detection of the ringer signal by the ringer detection unit, whether the communication control device is to generate a ringer signal in accordance with third switching control data stored in the data processing device,
   wherein said tenth program code sends a ringer control signal indicative of the determination to the communication control device, so that the communication control device generates the ringer signal by a specified one of a plurality of predetermined ringer patterns in response to the ringer control signal and supplies the ringer signal to the telephone unit to allow the telephone unit to ring out by the specified ringer pattern.

* * * * *

UNITED STATES PATENT AND TRADEMARK OFFICE
CERTIFICATE OF CORRECTION

PATENT NO.    : 6,434,225 B1
DATED         : August 13, 2002
INVENTOR(S)   : Toshihiro Azami et al.

It is certified that error appears in the above-identified patent and that said Letters Patent is hereby corrected as shown below:

<u>Title page,</u>
Item [56], References Cited, insert the following Foreign Patent References:

```
-- 4-61543    02/1992    Japan
5-56190       03/1993    Japan
5-75823       03/1993    Japan
10-75321      03/1998    Japan --
```

Signed and Sealed this

Twelfth Day of November, 2002

*Attest:*

*Attesting Officer*

JAMES E. ROGAN
*Director of the United States Patent and Trademark Office*